United States Patent
Uekubo

(10) Patent No.: US 9,507,958 B2
(45) Date of Patent: Nov. 29, 2016

(54) INFORMATION DISCLOSURE SYSTEM, INFORMATION DISCLOSURE SERVER, COMMUNICATION TERMINAL, INFORMATION DISCLOSING METHOD, AND NON-TRANSITORY COMPUTER-READABLE MEDIUM

(71) Applicant: NEC CASIO Mobile Communications, Ltd., Kawasaki-shi, Kanagawa (JP)

(72) Inventor: Masaki Uekubo, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/433,821

(22) PCT Filed: Oct. 4, 2013

(86) PCT No.: PCT/JP2013/005919
§ 371 (c)(1),
(2) Date: Apr. 6, 2015

(87) PCT Pub. No.: WO2014/057636
PCT Pub. Date: Apr. 17, 2014

(65) Prior Publication Data
US 2015/0278546 A1 Oct. 1, 2015

(30) Foreign Application Priority Data
Oct. 10, 2012 (JP) ................................. 2012-225333

(51) Int. Cl.
*H04L 29/06* (2006.01)
*G06F 21/62* (2013.01)
(Continued)

(52) U.S. Cl.
CPC ..... *G06F 21/6245* (2013.01); *G06F 17/30876* (2013.01); *G06Q 10/10* (2013.01);
(Continued)

(58) Field of Classification Search
CPC .................................................. G06F 21/6245
See application file for complete search history.

(56) References Cited

U.S. PATENT DOCUMENTS

| 8,015,019 B1 * | 9/2011 | Smith | G06F 17/3089 |
| | | | 705/1.1 |
| 8,504,559 B1 * | 8/2013 | Elman | G06Q 30/08 |
| | | | 705/321 |

(Continued)

FOREIGN PATENT DOCUMENTS

| JP | 2005-4342 A | 1/2005 |
| JP | 2005-317028 A | 11/2005 |

(Continued)

OTHER PUBLICATIONS

Benevenuto, Fabricio, et al. "Characterizing user behavior in online social networks." Proceedings of the 9th ACM SIGCOMM conference on Internet measurement conference. ACM, 2009.*

(Continued)

*Primary Examiner* — Shawnchoy Rahman

(57) ABSTRACT

An information disclosure system includes: an information disclosing unit; a setting unit; a history storage unit; and an interaction frequency calculating unit. The information disclosing unit discloses at least part of user's information as disclosure information to a communicating party. The setting unit sets a disclosure range for disclosing the user's information as the disclosure information. The history storage unit stores a history of communication between the user and the communicating party. The interaction frequency calculating unit calculates an interaction frequency between the user and the communicating party based on the history of the communication. The setting unit sets the disclosure range based on the interaction frequency calculated by the interaction frequency calculating unit.

18 Claims, 10 Drawing Sheets

(51) Int. Cl.

| | | |
|---|---|---|
| *G06Q 10/10* | (2012.01) | |
| *G06Q 50/00* | (2012.01) | |
| *G06Q 50/10* | (2012.01) | |
| *G06Q 50/32* | (2012.01) | |
| *G06F 17/30* | (2006.01) | |
| *H04W 4/20* | (2009.01) | |
| *H04W 12/02* | (2009.01) | |

(52) U.S. Cl.
CPC ............. *G06Q 50/01* (2013.01); *G06Q 50/10* (2013.01); *G06Q 50/32* (2013.01); *H04W 4/206* (2013.01); *H04W 12/02* (2013.01)

(56) References Cited

U.S. PATENT DOCUMENTS

| | | | | |
|---|---|---|---|---|
| 8,594,292 | B1* | 11/2013 | Moore | H04M 3/42042 379/201.01 |
| 8,938,500 | B1* | 1/2015 | Acharya | G06Q 50/01 705/319 |
| 9,286,397 | B1* | 3/2016 | Suleman | G06F 17/30864 |
| 9,294,537 | B1* | 3/2016 | Zuccarino | H04L 67/02 |
| 2005/0209999 | A1 | 9/2005 | Jou | |
| 2007/0266097 | A1* | 11/2007 | Harik | G06Q 30/02 709/204 |
| 2008/0189122 | A1 | 8/2008 | Coletrane et al. | |
| 2008/0189171 | A1* | 8/2008 | Wasserblat | G06Q 10/063 705/7.32 |
| 2009/0150380 | A1* | 6/2009 | Chen | G06Q 30/02 |
| 2010/0057859 | A1 | 3/2010 | Shen et al. | |
| 2010/0318571 | A1* | 12/2010 | Pearlman | H04L 63/104 707/784 |
| 2013/0297436 | A1* | 11/2013 | Vogel | G06Q 30/02 705/26.1 |
| 2014/0012932 | A1* | 1/2014 | Sharaf | H04L 51/32 709/206 |

FOREIGN PATENT DOCUMENTS

| | | |
|---|---|---|
| JP | 2006-331297 A | 12/2006 |
| JP | 2007-26419 A | 2/2007 |
| JP | 2008-130046 A | 6/2008 |
| JP | 2008-177713 A | 7/2008 |
| JP | 2010-15543 A | 1/2010 |
| JP | 2012-65270 A | 3/2012 |

OTHER PUBLICATIONS

Yuki Tomita et al., "An implementation of a personal communicator with privacy management control", IEICE Technical Report, Nov. 5, 2009, vol. 109, No. 273, pp. 27 to 32. English abstract. Cited in ISR.

International Search Report for PCT Application No. PCT/JP2013/005919, mailed on Oct. 29, 2013.

Extended European Search Report for EP Application No. EP13845268.5 dated May 2, 2016.

\* cited by examiner

INFORMATION DISCLOSURE SYSTEM, INFORMATION DISCLOSURE SERVER, COMMUNICATION TERMINAL, INFORMATION DISCLOSING METHOD, AND NON-TRANSITORY COMPUTER-READABLE MEDIUM

This application is a National Stage Entry of PCT/JP2013/005919 filed on Oct. 4, 2013, which claims priority from Japanese Patent Application 2012-225333filed on Oct. 10, 2012, the contents of all of which are incorporated herein by reference, in their entirety.

TECHNICAL FIELD

The present invention relates to an information disclosure system, an information disclosure server, a communication terminal, an information disclosing method, and a non-transitory computer-readable medium.

BACKGROUND ART

In recent years, SNSs (Social Networking Services) have rapidly spread, and are widely used. Further, information is actively shared between individuals through such an infrastructure. Hence, in addition to a conventional mode of sharing information by sending and receiving messages such as electronic mails on 1-to-1 basis, a mode (e.g. an SNS) of sharing information by allowing specific or non-specific people to browse messages posted by individuals is widely used.

Managing who to disclose information to share becomes difficult as the amount of the information and the number of parties to share information with increase. This is because individuals have difficulty in paying thorough attention to an information share state. As a result, a risk that personal information may be unintentionally leaked increases. That is, a likelihood that basic information such as an address, a name and a date of birth, and various pieces of information such as the faith, the hobbies, tastes, behavior history and personal relationships may be unintentionally leaked through information sharing means such as an SNS has increased more than ever.

Multiple SNSs provide means for setting an information disclosure range to prevent such a leakage of personal information from occurring. For example, Facebook (registered trademark) makes it possible to set a release range to "only me", "specific people or list of people", "friends", "friends of friends" and "release" per each message. Thus, it is possible to disclose highly confidential information to only specific parties.

Usually, this information disclosure range is set statically by a user. By, for example, setting per each message who to disclose information to upon posting a message, the user can manage how to share information in message units.

Patent Literature 1 to 5 discloses techniques for setting or changing a range for disclosing information to other people as related techniques.

Patent Literature 1 discloses a file management system whose object is to specify a change in a storage medium which stores information or a whereabouts of a person, and prevents an operation leading to leakage of information from being performed in advance. The file management system according to Patent Literature 1 prevents an operation which is highly likely to lead to leakage of information beyond a share range by setting the share range to information such as disperse files under management of an organization according to a value of the information.

In addition, the file management system according to Patent Literature 1 sets execution conditions in label units per operation which is highly likely to lead to leakage of information by setting as a label a combination of a category indicating a type of information, and a confidential level. Further, the file management system includes a policy list in which the execution conditions and a share destination are set. The file management system sets a file share range by allocating a label to a file instead of directly allocating a policy to the file.

Patent Literature 2 discloses a social network information managing method and social network information management system whose object is to manage as connection information a history that people actually have met at a specific place and share and effectively utilize personal connection information. The management system according to Patent Literature 2 generates the connection information by analyzing and collecting interaction status information and personal attribute information detected when people form a community through an interaction.

In addition, the social network information management system according to Patent Literature 2 detects a personal attribute ID of a person who interacts with another person in a specific area, and an interaction period, and generates interaction status information including an area ID, an interaction period and a personal attribute ID. The management system collects and filters this interaction status information, and creates real community information. Next, the management system calculates a connection level from this real community information, generates connection information and provides the connection information for retrieval of the connection information.

Patent Literature 3 discloses a communication control apparatus of a Weblog system which preferentially presents communication information from a user who frequently performs communication while making a Weblog site open, and excludes unilateral information such as spams. This communication apparatus extracts a communication relationship between users from a history of communication activities which makes it possible to specify a user on a website in the Weblog system which encourages communication between users through comments and trackbacks given to a general Weblog site operated by a user. Further, the communication control apparatus calculates an inter-user distance value which takes a lower value when a communication activity is frequent (the number of times and the frequency) and a bidirectionality (comments, advertisement and trackbacks are given from both users) are higher, and controls content/display order or the like of communication information which is presented to a user according to this distance value.

The communication control apparatus according to Patent Literature 3 counts frequencies or the like of communication activities performed on a Weblog site, and specifies a user closer to a given user from an inter-user distance value calculated based on the frequencies. Consequently, the communication control apparatus can preferentially present information related to communication which a user more frequently performs bidirectionally while basically generating a fully open system like the current Weblog service. Further, the communication control apparatus can exclude unilateral information such as spams.

Patent Literature 4 discloses a social network electronic mail filtering method. This method includes the following steps. First, the method specifies a first electronic mail address whose distance from a user is 0 degree in a social network. Next, the method associates the first electronic mail address with a first trust level. Next, the method specifies a second electronic mail address whose distance from the user is 1 degree in the social network. Further, the method associates the second electronic mail address with a second trust level. According to the above method, it is possible to filter an electronic mail message based on the social network.

Patent Literature 5 discloses a server which deletes profile information of a user from an address book of a mobile terminal apparatus of another user according to a frequency of communication.

CITATION LIST

Patent Literature

Patent Literature 1: Japanese Unexamined Patent Publication No. 2010-15543
Patent Literature 2: Japanese Unexamined Patent Publication No. 2007-26419
Patent Literature 3: Japanese Unexamined Patent Publication No. 2006-331297
Patent Literature 4: Japanese Unexamined Patent Publication No. 2005-317028
Patent Literature 5: Japanese Unexamined Patent Publication No. 2012-065270

SUMMARY OF INVENTION

Technical Problem

There is a problem that, when a user discloses user's information to communicating parties on an SNS or the like, the user discloses all pieces of user's information even to communicating parties who have become alienated from the user, and cannot stop disclosing part of information which the user does not wish to disclose. Therefore, there is a concern that the user's personal information may be leaked to the alienated communicating parties. The above Patent Literature 1 to 5 cannot solve this problem since a personal relationship with alienated people and a range for disclosing user's information are not associated at all.

The present invention has been made to solve the above problem, and an object of the present invention is to provide an information disclosure system, an information disclosure server, a communication terminal, an information disclosing method and a program which can limit information disclosure of a user based on a frequency of an interaction between the user and communicating parties.

Solution to Problem

A first aspect of the present invention includes an information disclosure system which discloses user's information to a communicating party. The information disclosure system includes: an information disclosing unit; a setting unit; a history storage unit; and an interaction frequency calculating unit. The information disclosing unit discloses at least part of the user's information as disclosure information to the communicating party. The setting unit sets a disclosure range for disclosing the user's information as the disclosure information in the information disclosing unit. The history storage unit stores a history of communication between the user and the communicating party. The interaction frequency calculating unit calculates an interaction frequency between the user and the communicating party based on the history of the communication stored in the history storage unit. The setting unit sets the disclosure range based on the interaction frequency calculated by the interaction frequency calculating unit.

A second aspect of the present invention includes an information disclosure server which discloses user's information to a communicating party. The information disclosure server includes: an information disclosing unit; a setting unit; a history storage unit; and an interaction frequency calculating unit. The information disclosing unit discloses at least part of the user's information as disclosure information to the communicating party. The setting unit sets a disclosure range for disclosing the user's information as the disclosure information in the information disclosing unit. The history storage unit stores a history of communication between the user and the communicating party. The interaction frequency calculating unit calculates an interaction frequency between the user and the communicating party based on a history of the communication stored in the history storage unit. The setting unit sets the disclosure range based on the interaction frequency calculated by the interaction frequency calculating unit.

A third aspect of the present invention includes a communication terminal which sets a disclosure range for disclosing user's information to a communicating party.

The communication terminal includes: a setting unit; a history storage unit; and an interaction frequency calculating unit. The setting unit sets a disclosure range for disclosing at least part of the user's information as disclosure information to the communicating party. The history storage unit stores a history of communication between the user and the communicating party. The interaction frequency calculating unit calculates an interaction frequency between the user and the communicating party based on a history of communication between the user and the communicating party. The setting unit sets the disclosure range based on the interaction frequency calculated by the interaction frequency calculating unit.

A fourth aspect of the present invention includes an information disclosing method which discloses user's information to a communicating party. This information disclosing method includes following steps (a) to (d);
(a) disclosing at least part of the user's information as disclosure information to the communicating party;
(b) storing a history of communication between the user and the communicating party;
(c) calculating an interaction frequency of the user and the communicating party based on a stored history of the communication; and
(d) setting a disclosure range for disclosing the user's information as the disclosure information based on the calculated interaction frequency.

A fifth aspect of the present invention includes a computer program. The program is a program which causes a computer to execute the method according to the above fourth aspect of the present invention.

Advantageous Effects of Invention

With the present invention, it is possible to provide an information disclosure system, an information disclosure server, a communication terminal, an information disclosing method and a program which can limit information disclosure of a user based on a frequency of an interaction between the user and communicating parties.

DESCRIPTION OF EMBODIMENTS

Figure 1:
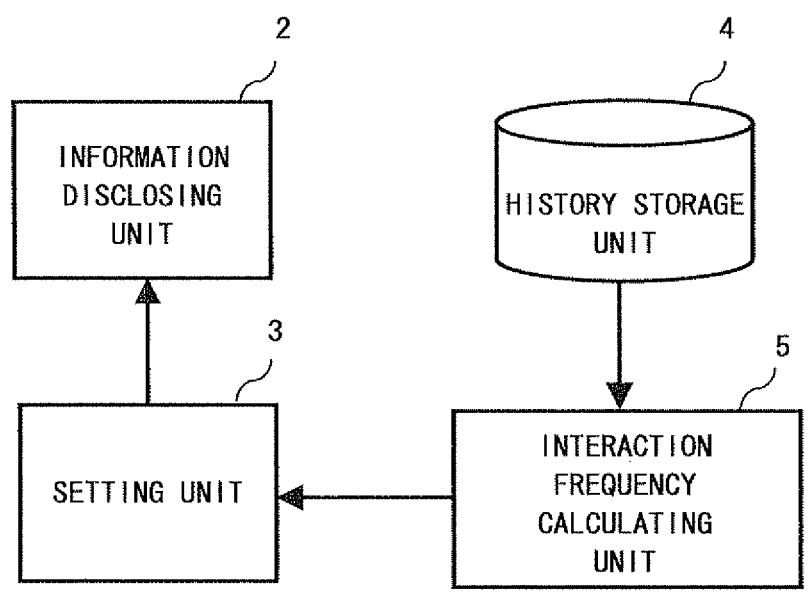
FIG. 1 is a block diagram illustrating a configuration example of an information disclosure system according to the first embodiment.

Embodiments of the present invention will be described below with reference to the accompanying drawings. In addition, in each drawing, elements will be optionally omitted and simplified for clarification of description. Further, the same elements will be assigned the same reference numerals in each drawing, and overlapping descriptions will be optionally omitted.

Each element of an information disclosure system disclosed in the following drawings as a functional block which performs various types of processing can be configured by a CPU (Central Processing Unit), a memory or other circuits in terms of hardware, and can be configured by a program loaded to a memory in terms of software. Accordingly, it should be understood by one of ordinary skill in the art that these functional blocks are realized in multiple ways such as hardware alone, software alone or a combination of hardware and software, and are not limited to one of these.

First Embodiment

The first embodiment of the present invention will be described below with reference to the accompanying drawings. FIG. 1 is a block diagram illustrating a configuration example of an information disclosure system according to the first embodiment.

An information disclosure system 1 is an information disclosure system which discloses information of a given user to a communicating party of the user. The information disclosure system 1 includes an information disclosing unit 2, a setting unit 3, a history storage unit 4 and an interaction frequency calculating unit 5.

The information disclosing unit 2 discloses at least part of user's information as disclosure information, to the communicating party. In addition, the "user's information" is a description of a user's profile, blog or the like. The profile optionally includes personal information such as a user's name, pen name, gender, address, date of birth, history, affiliated organization, face picture and the like.

The setting unit 3 sets a disclosure range for disclosing user's information as disclosure information in the information disclosing unit 2. In this regard, the setting unit 3 may define as a disclosure range a percentage of an information amount of the user's information to disclose. For example, the setting unit 3 makes a setting of disclosing 70% of the user's information registered in the information disclosure system 1.

Further, the setting unit 3 may set as the disclosure range whether or not to disclose particularly important information of the user's information. The important information is, for example, information for personally specifying a user or information (so-called "beneficial information") for benefiting a communicating party. The information for personally specifying a user is information which shows a profile of the user or a user's everyday behavior or information which makes it possible to predict the user's everyday behavior.

The user's profile is, for example, information such as a user's name, gender, address, date of birth, history, affiliated organization, face picture and the like. There is a case where this information is written in a profile field of an SNS and is written as a message by a user in a blog or the like.

The information which shows a user's everyday behavior or the information which makes it possible to predict the user's everyday behavior refers to, for example, a message which the user writes about a user's behavior. When the user writes a message saying that "Today, I went to park ΔΔ near station ○○, and did shopping and bought □□", it is possible to read information about user's behavior range, hobbies and tastes from this message.

The setting unit 3 may set whether or not to disclose the above important information according to an interaction frequency of the user and the communicating party calculated by the interaction frequency calculating unit 5 described later. Alternatively, the setting unit 3 may make a setting for disclosing user's important information stepwise according to the calculated interaction frequency of the user and the communicating party.

The history storage unit 4 stores a history of communication between the user and the communicating party. This communication history is, for example, "a history related to communication between a user and a communicating party", "a history related to an interaction between a user and a communicating party on a network" or "a history of real contact between a user and a communicating party". Specific contents of the history will be described in the second and subsequent embodiments.

The communication history stored in the history storage unit 4 may be automatically generated by the information disclosure system 1 by detecting communication between the user and the communicating party, and stored in the history storage unit 4. Alternatively, after the user communicates with the communicating party, the user may store a history of this communication in the history storage unit 4. The communication history is information converted into data to enable the interaction frequency calculating unit 5 to calculate an interaction frequency.

The interaction frequency calculating unit 5 calculates the interaction frequency of the user and the communicating party based on the communication history stored in the history storage unit 4. This interaction frequency may set frequencies at two stages such as "familiar" (high) and "alienated" (low), or may set frequencies at three or more stages.

The setting unit 3 sets a disclosure range based on the interaction frequency calculated by the interaction frequency calculating unit 5. For example, the setting unit 3 changes the disclosure range to set when the calculated interaction frequency is changed from a previously calculated interaction frequency. Consequently, the information disclosure system 1 can disclose the user's information to a communicating party whose relationship with the user has changed as time passes so that it can deal with this change in the relationship.

When, for example, the interaction frequency calculated by the interaction frequency calculating unit 5 is lower than the previously calculated interaction frequency, the setting unit 3 can set the disclosure range to one narrower than a previous disclosure range (disclose part of information). Consequently, the information disclosure system 1 can prevent information from being disclosed to a communicating party who has been alienated from the user as time passes and thus the user does not want the information to be disclosed thereto.

By contrast with this, when the interaction frequency calculated by the interaction frequency calculating unit 5 is higher than the previously calculated interaction frequency, the setting unit 3 can set the disclosure range to one wider than the previous disclosure range. Consequently, by actively disclosing the user's information to a communicating party who has become familiar with the user as time passes, the information disclosure system 1 can increase the degree of familiarity between the user and the communicating party.

In addition, the setting unit 3 may set the disclosure range to one narrower than the previous disclosure range by decreasing a percentage of the information amount of the user's information to disclose. By contrast with this, the setting unit 3 may set the disclosure range to one wider than the previous disclosure range by increasing the percentage of the information amount of the user's information to disclose.

Alternatively, the setting unit 3 may set the disclosure range to one narrower than the previous disclosure range by making a setting not to disclose user's important information which has been disclosed to the communicating party so far. In contrast with this, the setting unit 3 may set the disclosure range to one wider than the previous disclosure range by making a setting to disclose the user's important information which has not been disclosed to the communicating party so far. In addition, details of the user's important information are as described above.

An example of processing of the setting unit 3 with respect to each frequency when three stages of frequencies such as "familiar" (high), "ordinary" and "alienated" (low) are set as interaction frequencies by the interaction frequency calculating unit 5 will be described. When the interaction frequency calculating unit 5 calculates the frequency of an interaction between the user and the communicating party as "familiar", the setting unit 3 discloses all pieces of user's profile information. More specifically, the setting unit 3 discloses all pieces of personal information such as the user's name, pen name, gender, address, date of birth, history, affiliated organization, face picture and the like in the profile field. Further, the setting unit 3 discloses to the communicating party all pieces of the information which shows a user's everyday behavior or the information which makes it possible to predict the user's everyday behavior. When, for example, the user writes a message saying that "Today, I went to the park ΔΔ near the station ○○, and did shopping and bought □□", the setting unit 3 discloses the entire message to the communicating party.

When the interaction frequency calculating unit 5 calculates the interaction frequency of the user and the communicating party as "ordinary", the setting unit 3 discloses part of the user's important information. More specifically, the setting unit 3 may disclose user's pen name, gender and part of the name, part of the address (an address at a prefectural or municipal level), part of the history, part of the face picture or the like in the profile field. While disclosing personal information to some degree and thus enabling the communicating party to assume what kind of person the user is, the setting unit 3 does not disclose the personal information of such a level that the user can be personally specified.

In this regard, the setting unit 3 partially discloses information which shows user's everyday behavior or information which makes it possible to predict the user's everyday behavior. When, for example, the user writes a message saying that "Today, I went to the park ΔΔ near the station ○○, and did shopping and bought □□", the setting unit 3 discloses only part of this message saying that "Today, I went near the station ○○, and did shopping", not the entire message. Thus, the setting unit 3 notifies the communicating party of part of the user's everyday behavior instead of all of the user's everyday behavior.

When the interaction frequency calculating unit 5 calculates the interaction frequency of the user and the communicating party as "alienated", the setting unit 3 does not disclose all pieces of the user's important information. Alternatively, the setting unit 3 may further narrow a range for disclosing the user's important information compared to when the interaction frequency is "ordinary". For example, the setting unit 3 may disclose only the user's pen name and gender in the profile field, while it may not disclose the name, the address and the history at all. Thus, the setting unit 3 can disclose to the communicating party no information which gives a clue to who the user is.

The setting unit 3 does not disclose information which shows the user's everyday behavior or the information which makes it possible to predict the user's everyday behavior, either. When, for example, the user writes a message saying that "Today, I went to the park ΔΔ near the station ○○, and did shopping and bought □□", the setting unit 3 does not disclose even part of this message to the communicating party. Thus, the setting unit 3 does not notify the communicating party of the user's everyday behavior.

Meanwhile, the setting unit 3 makes a setting of disclosing information other than important information of the user's information even when the interaction frequency calculating unit 5 calculates the interaction frequency of the user and the communicating party as any one of "familiar", "ordinary" and "alienated". Thus, the setting unit 3 can set the information disclosure range according to an information type of the user's information. The setting unit 3 changes only a disclosure range of information which makes it possible to specify the user, and does not limit an exchange of other information between the user and the communicating party. Consequently, it is possible to minimize the limitation of communication between the user and the communicating party.

Figure 2:
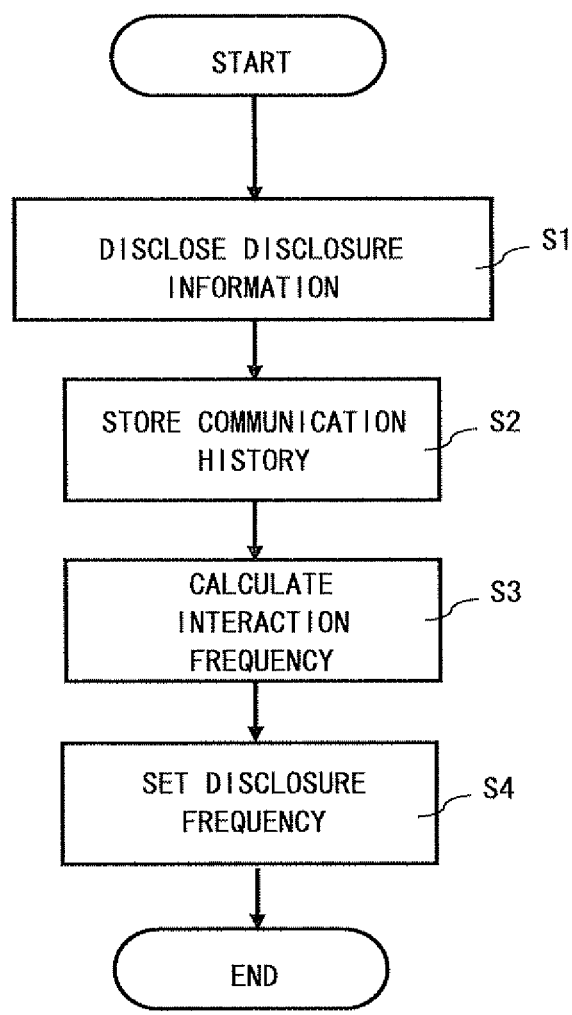
FIG. 2 is a flowchart illustrating an example of processing of an information disclosing method according to the first embodiment.

FIG. 2 is a flowchart illustrating an example of processing of an information disclosing method of disclosing user's information from the information disclosure system 1 to the communicating party. First, the information disclosing unit 2 discloses at least part of the user's information as disclosure information to the communicating party (step S1).

The history storage unit 4 stores a communication history of the user and the communicating party (step S2). The interaction frequency calculating unit 5 calculates an interaction frequency of the user and the communicating party based on the communication history stored in the history storage unit 4 (step S3). Further, the setting unit 3 sets a disclosure range for disclosing the user's information as disclosure information based on the interaction frequency calculated by the interaction frequency calculating unit 5 (step S4).

As described above, the setting unit 3 sets the disclosure range based on the interaction frequency calculated by the interaction frequency calculating unit 5. Consequently, the information disclosure system 1 can limit information disclosure of the user based on the interaction frequency of the user and the communicating party.

Second Embodiment

Figure 3:
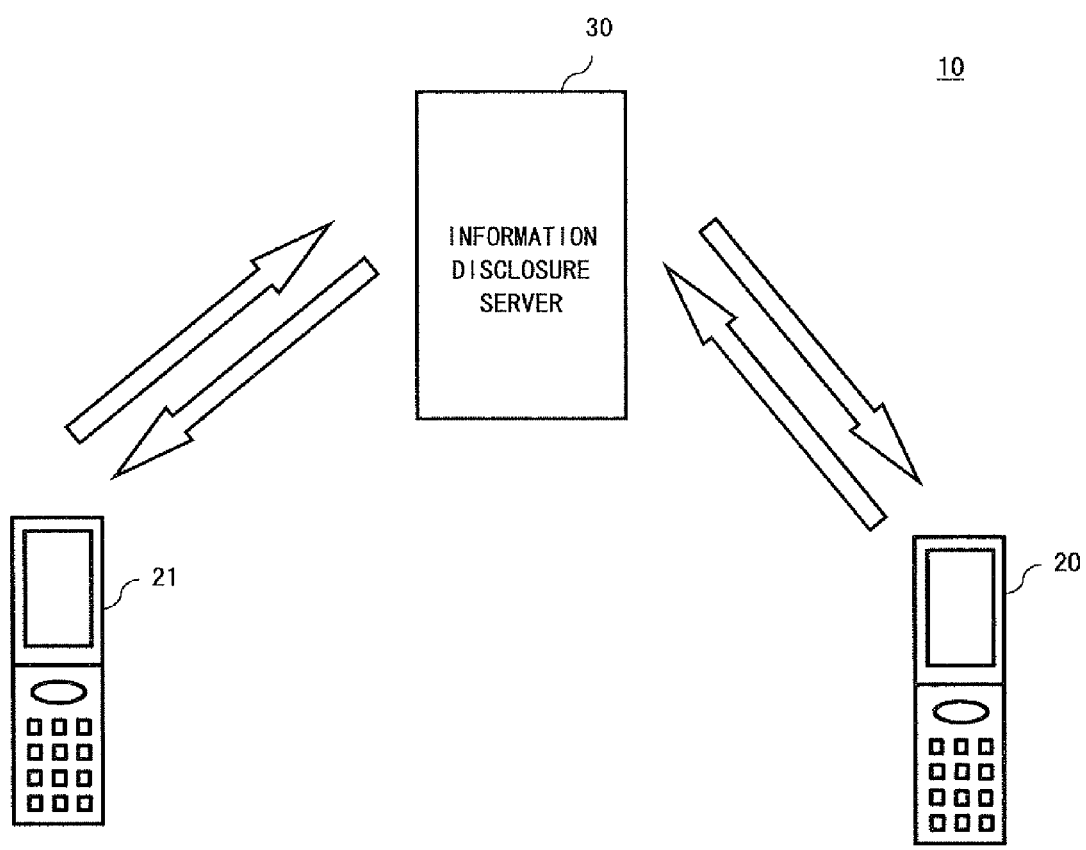
FIG. 3 is an image diagram illustrating a configuration example of an information disclosure system according to the second embodiment.

The second embodiment of the present invention will be described below with reference to the accompanying drawings. FIG. 3 is an image diagram illustrating a configuration example of an information disclosure system according to the second embodiment. An information disclosure system 10 includes a user terminal (a user side mobile terminal) 20, another party terminal (communicating party side mobile terminal) 21 and an information disclosure server 30. In the second embodiment, the information disclosure system 10 is a system which discloses user's information to each of the other party users on an SNS including the user and a plurality of other party users of the user (communicating parties) as members.

In FIG. 3, the user terminal 20 executes wireless communication (interacts) with the other party terminal 21 through the information disclosure server 30. The information disclosure server 30 stores an interaction history of the user terminal 20 and the other party terminal 21, and calculates an interaction frequency of the user and each of the other party users based on this interaction history. Further, the information disclosure server 30 sets based on the calculated interaction frequency a disclosure range of the user's information which each of the other party users can browse upon accessing the SNS from their respective party terminals 21. In addition, the interaction frequency corresponds to an example of the interaction frequency in the first embodiment.

Figure 4:
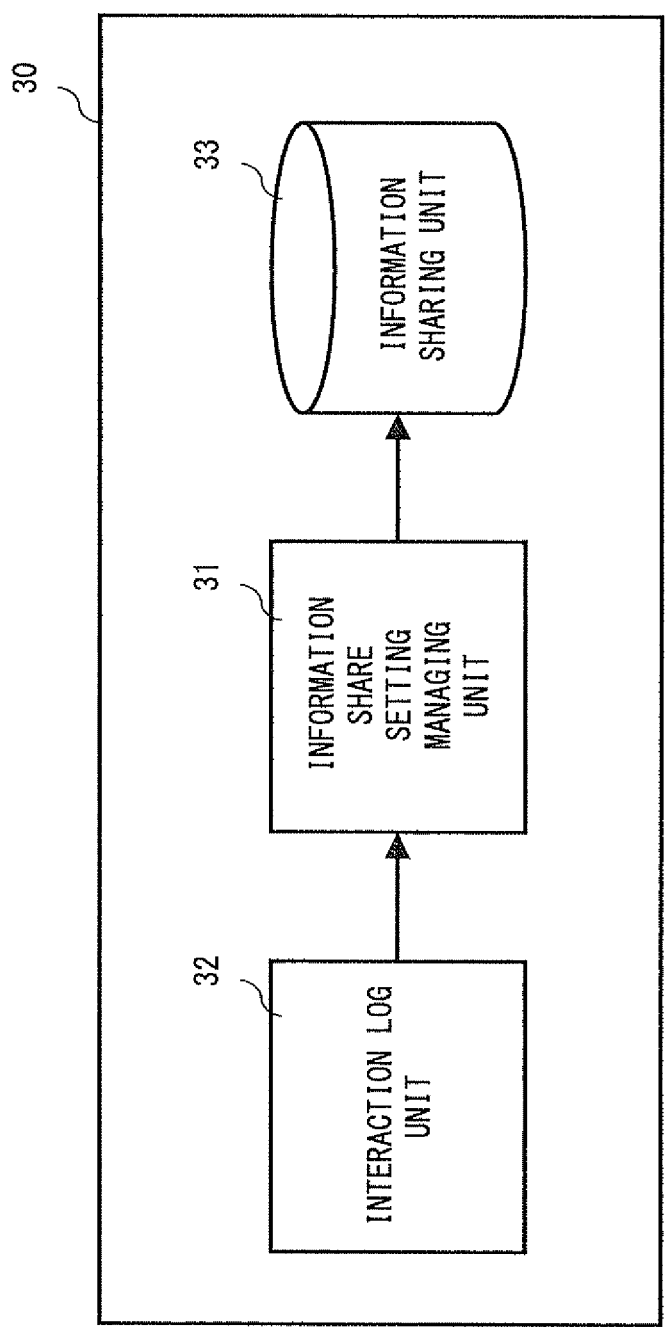
FIG. 4 is a block diagram illustrating a configuration example of the information disclosure server according to the second embodiment.

FIG. 4 is a block diagram illustrating a configuration example of the information disclosure server 30. The information disclosure server 30 includes an information share setting managing unit 31, an interaction log unit 32 and an information sharing unit 33. The information share setting managing unit 31 is connected with the interaction log unit 32 and the information sharing unit 33. The information share setting managing unit 31 obtains log information related to the interaction history of the user and each of the other party users from the interaction log unit 32. The information share setting managing unit 31 provides information required to set an information share range (disclosure range) in the information sharing unit 33, based on the received log information. The information share setting managing unit 31 will be described in detail later.

The interaction log unit 32 stores a log related to an interaction between the user terminal 20 and the other party terminal 21 through the information disclosure server 30. The log related to the interaction described herein refers to log information related to communication between the user and the other party, for example, an exchange of a message between a user and the other party user on an SNS, a comment or a trackback on a user's blog from the other party user, and a user's comment or trackback on the other party user's blog. The log includes information indicating an interacting party, an interaction time and the like.

The information sharing unit 33 discloses at least part of the user's information as disclosure information to each of the other party users according to the set disclosure range based on the information generated by the information share setting managing unit 31. An example of the user's information is as described in the first embodiment. In addition, a deadline for information disclosure performed by the information sharing unit 33 is not set.

Figure 5:
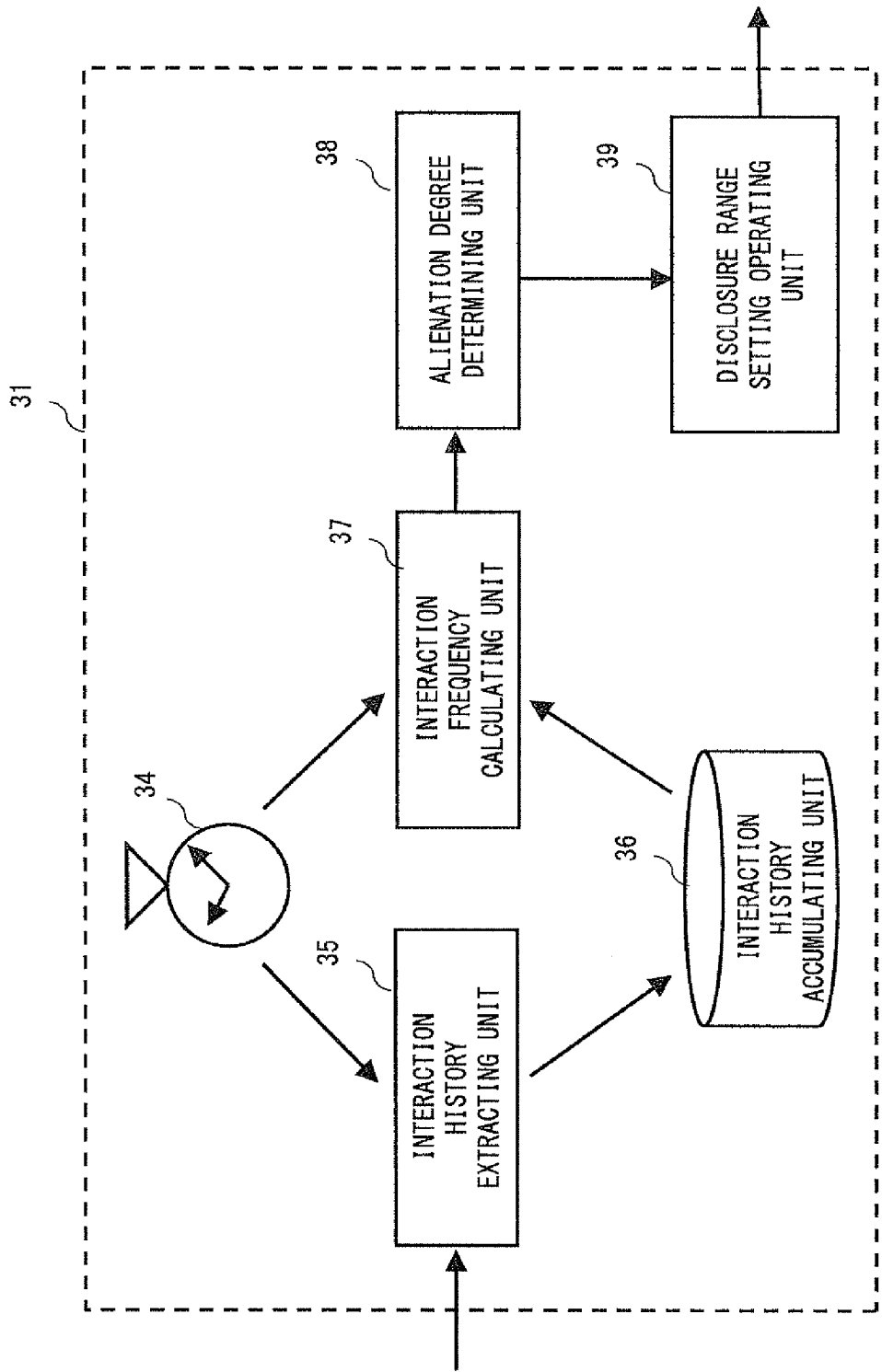
FIG. 5 is a block diagram illustrating a configuration example of the information share setting managing unit according to the second embodiment.

FIG. 5 is a block diagram illustrating a configuration example of the information share setting managing unit 31. The information share setting managing unit 31 includes a timing generating unit 34, an interaction history extracting unit 35, an interaction history accumulating unit 36, an interaction frequency calculating unit 37, an alienation degree determining unit 38 and a disclosure range setting operating unit 39.

The timing generating unit 34 transmits an event signal to the interaction history extracting unit 35 when a predetermined time comes. The predetermined time refers to a time set by a system or a user in advance. For example, the timing generating unit 34 transmits a cyclic signal set by the user in advance, and the interaction history extracting unit 35 cyclically starts processing according to this cyclic signal. The timing generating unit 34 transmits an event signal likewise to the interaction frequency calculating unit 37, and the interaction frequency calculating unit 37 cyclically starts processing according to this event signal. In addition, the timing generating unit 34 outputs event signals at different timings between the interaction history extracting unit 35 and the interaction frequency calculating unit 37.

The interaction history extracting unit 35 selects log information from the interaction log unit 32 per each time the event signal is generated by the timing generating unit 34 (every time the event signal is received), and inputs the selected log information to the interaction history extracting unit 35. The interaction history extracting unit 35 extracts information (interaction history information), which is a history of an interaction, from this log information, and stores the information in the interaction history accumulating unit 36. The interaction history information includes information such as an interacting party, an interaction time and the like.

The interaction history accumulating unit 36 accumulates (stores) the interaction history information generated by the interaction history extracting unit 35 in an internal database. The interaction frequency calculating unit 37 can access this database.

The interaction frequency calculating unit 37 obtains interaction history information related to each of the other party users from the interaction history accumulating unit 36 per each time an event signal is generated by the timing generating unit 34, and calculates an interaction frequency of the user and each of the other party users based on the interaction history information. The interaction frequency calculating unit 37 provides information of the interaction frequency of the user and each of the other party users to the alienation degree determining unit 38.

In this regard, the timing generating unit 34 first transmits an event signal to the interaction history extracting unit 35 at a predetermined time. According to this event signal, the interaction history extracting unit 35 accumulates the interaction history information in the interaction history accumulating unit 36 based on the information stored in the interaction log unit 32. At a timing at which interaction history information of a fixed period is accumulated in the interaction history accumulating unit 36, the timing generating unit 34 outputs an event signal to the interaction frequency calculating unit 37. The interaction frequency calculating unit 37 calculates an interaction frequency of the user and each of the other party users based on the interaction history information accumulated in the interaction history accumulating unit 36 according to this event signal.

The alienation degree determining unit 38 is connected to the interaction frequency calculating unit 37 and the disclosure range setting operating unit 39. The alienation degree determining unit 38 determines whether or not a personal relationship between each of the other party users and the user is alienated based on the interaction frequency of the user and each of the other party users inputted from the interaction frequency calculating unit 37.

The alienation degree determining unit 38 determines the degree of alienation of a personal relationship between the user and each other party user as follows, for example. The alienation degree determining unit 38 includes a predetermined threshold determined in advance. This predetermined threshold may be set by the user or may be automatically set by the alienation degree determining unit 38. The alienation degree determining unit 38 determines that connection between the user and a specific other party user is familiar when an interaction frequency of the user and the specific other party user inputted from the interaction frequency calculating unit 37 is the predetermined threshold or more. By contrast with this, the alienation degree determining unit 38 determines that connection between the user and the specific other party user is alienated when the interaction frequency of the user and the specific other party user inputted from the interaction frequency calculating unit 37 is lower than the predetermined threshold.

The alienation degree determining unit 38 outputs a result of the determined degree of alienation to the disclosure range setting operating unit 39. In this regard, the alienation degree determining unit 38 may output results of the determined degrees of alienation to all other party users whose degrees of alienation have been determined.

Alternatively, the alienation degree determining unit 38 may output information of a list of the other party users who have been determined to be alienated, to the disclosure range setting operating unit 39. Alternatively, the alienation degree determining unit 38 may output information of a list of other party users who have been determined to be familiar, to the disclosure range setting operating unit 39. Alternatively, the alienation degree determining unit 38 may output information of both of the list of the other party users who have been determined to be familiar and a list of the other party users who have been determined to be alienated, to the disclosure range setting operating unit 39.

The disclosure range setting operating unit 39 sets an information share range of the information sharing unit 33 with respect to each of the other party users based on the information (e.g. the list of the other party users) inputted from the alienation degree determining unit 38. The disclosure range setting operating unit 39 executes processing of changing an information share range with respect to a specific other party user from a previous information share range depending on the case.

In addition, the interaction history accumulating unit 36 corresponds to a history storage unit 4 in FIG. 1, the interaction frequency calculating unit 37 corresponds to an interaction frequency calculating unit 5 in FIG. 1, the alienation degree determining unit 38 and the disclosure range setting operating unit 39 correspond to a setting unit 3 in FIG. 1 and the information sharing unit 33 corresponds to an information disclosing unit 2 in FIG. 1.

Figure 6:
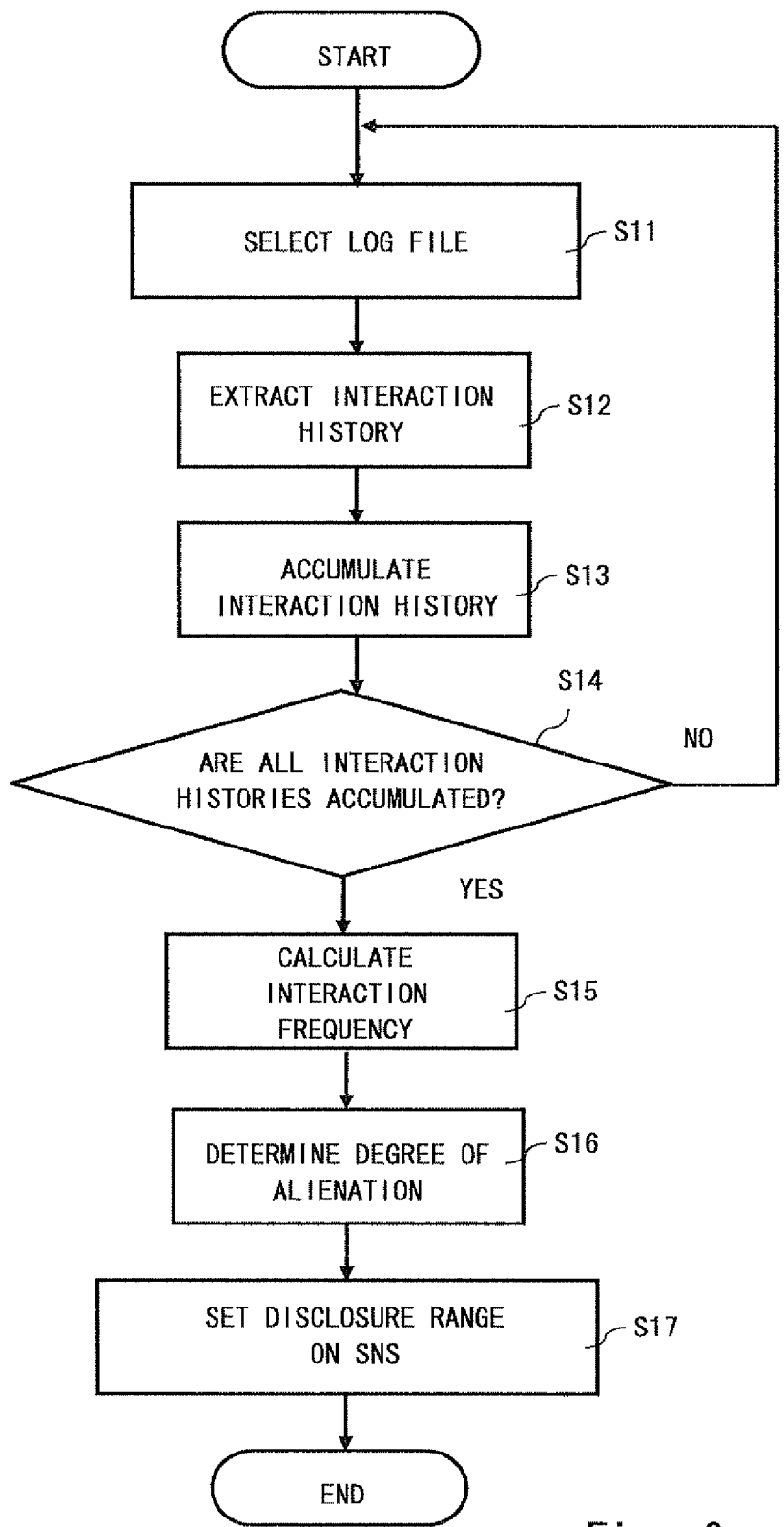
FIG. 6 is a flowchart illustrating an example of processing executed by the information share setting managing unit according to the second embodiment.

FIG. 6 is a flowchart illustrating an example of processing executed by the information share setting managing unit 31. The processing executed by the information share setting managing unit 31 will be described below with reference to FIG. 6.

The timing generating unit 34 first outputs an event signal to the interaction history extracting unit 35. The interaction history extracting unit 35 selects one file from analysis target log files stored in the interaction log unit 32, based on this event signal (step S11). In this regard, the log file refers to a file group including part of information related to a history of an interaction with another party user. When there are a plurality of analysis target log files per application, the interaction history extracting unit 35 selects one file from the log files. In addition, the analysis target log file refers to a log file stored in the interaction log unit 32 between a current event signal and a previous event signal.

Next, the interaction history extracting unit 35 extracts information related to an interaction record from the file selected in step S11 (step S12). In this regard, the interaction history extracting unit 35 extracts information which makes it possible to specify at least an interacting party of the user and an interaction history of the interacting party and the user as information related to the interaction from the log file. For example, the interaction history extracting unit 35 extracts information such as a communicating party, communicating means, a communication date and the like.

The interaction history extracting unit 35 accumulates in the interaction history accumulating unit 36 the interaction history extracted in step S12 (step S13). This interaction history accumulating unit 36 additionally accumulates information extracted per file read by the interaction history extracting unit 35.

Further, the interaction history accumulating unit 36 may store part or all pieces of information extracted by the interaction history extracting unit 35 at a past time before an event signal outputted lately to the interaction history extracting unit 35.

More specifically, the above mentioned storing is as follows. For example, every time an event signal is outputted to the interaction history extracting unit 35 in order of times t1, t2, t3 and . . . , the interaction history extracting unit 35 accumulates the interaction history extracted in step S12 in the interaction history accumulating unit 36. Now, it is assumed that the event signal is outputted to the interaction history extracting unit 35 at the time t3, and the interaction history extracting unit 35 accumulates the interaction history extracted in step S12 in the interaction history accumulating unit 36 according to the event signal. In this regard, the interaction history accumulating unit 36 newly accumulates an interaction history related to a log accumulated in the interaction log unit 32 at the past times t2 to t3. In this regard, in the interaction history accumulating unit 36, the interaction history related to a log accumulated in the interaction log unit 32 at the past times t1 to t2 (an interaction history accumulated in response to an output of an event signal to the interaction history extracting unit 35 at the time t2) may continue to be accumulated without being discarded. That is, the interaction history of the user and the other party user at the past times t1 to t2 may continue to be accumulated in the interaction history accumulating unit 36.

Further, in the interaction history accumulating unit 36, the interaction history related to a log accumulated in the interaction log unit 32 before the past time t1 (an interaction history accumulated in response to an output of an event signal to the interaction history extracting unit 35 at the time t1) may continue to be accumulated without being discarded. That is, the interaction history of the user and the other party user before the past time t1 may continue to be accumulated in the interaction history accumulating unit 36.

There are some methods for the interaction history accumulating unit 36 to delete accumulated data. For example, the interaction history accumulating unit 36 may preferentially delete old data when a storage capacity reaches an upper limit. Alternatively, the interaction history accumulating unit 36 may preferentially delete information prior to the last event signal but one per each other party user. This deleting algorithm depends on an algorithm of calculating an interaction frequency in step S15 described later.

The interaction history extracting unit 35 determines whether or not interaction histories of an entire target file group are accumulated in the interaction history accumulating unit 36 (step S14). When the interaction histories of the entire target file group are not accumulated in the interaction history accumulating unit 36 (No in step S14), the interaction history extracting unit 35 selects a log file related to an interaction history which is not yet accumulated in the interaction history accumulating unit 36 among target log files stored in the interaction log unit 32 (step S11). The interaction history extracting unit 35 executes the processing in steps S11 and S12 with respect to this log file below.

In other words, a series of processing in steps S11 to S13 is repeated until the entire target file group is processed. When, for example, the timing generating unit 34 starts the series of this processing at a given time, the series of processing is repeated until all the target files are processed.

When the interaction histories of the entire target file group are accumulated in the interaction history accumulating unit 36 (Yes in step S14), the interaction frequency calculating unit 37 calculates an interaction frequency per other party user based on the interaction history accumulated in the interaction history accumulating unit 36 (step S15).

The interaction frequency calculating unit 37 calculates a time interval at which, for example, an interaction between the user and the other party user is executed, and calculates this time interval as an interaction frequency of the user and the other party user. Alternatively, the interaction frequency calculating unit 37 calculates an average interaction time interval of a past predetermined number of times or in a past predetermined time, and calculates this interaction time interval as an interaction frequency of the user and the other party user. Further, the interaction frequency calculating unit 37 may calculate the number of times of interactions between the user and the other party user in the past predetermined time, and calculate this number of times of interactions as the interaction frequency between the user and the other party user. Alternatively, the interaction frequency calculating unit 37 may calculate the interaction frequency based on at least one of an interaction time interval, the number of times of interactions, contents of the interaction and the like. The interaction frequency calculating unit 37 provides information of the interaction frequency between the user and each of the other party users calculated as described above to the alienation degree determining unit 38.

In addition, as described above, in the interaction history accumulating unit 36, part or all pieces of information extracted by the interaction history extracting unit 35 may be stored at a past time prior to an event signal outputted lately to the interaction history extracting unit 35.

More specifically, the above mentioned storing is as follows. For example, every time an event signal is outputted to the interaction history extracting unit 35 in order of the times t1, t2, t3, t4 and . . . , the interaction history extracting unit 35 accumulates the interaction history extracted in step S12 in the interaction history accumulating unit 36. Now, it is assumed that an event signal is outputted to the interaction history extracting unit 35 at the time t4, and the interaction history extracting unit 35 accumulates the interaction history extracted in step S12 in the interaction history accumulating unit 36 according to the event signal. In this regard, in the interaction history accumulating unit 36, the interaction histories accumulated in the interaction history accumulating unit 36 after the past time t2 still continue to be accumulated. When an event signal is outputted to the interaction frequency calculating unit 37 after the time t4, the interaction frequency calculating unit 37 calculates the interaction frequency per other party user based on the interaction history of the user and the other party user at the times t1 to t4.

There may be a case where, when the event signal is outputted to the interaction history extracting unit 35 at the time t4, the interaction histories accumulated in the interaction history accumulating unit 36 after the past time t3 still continue to be accumulated in the interaction history accumulating unit 36. In this case, the interaction frequency calculating unit 37 calculates the interaction frequency per other party user based on the interaction history of the user and the other party user at the times t2 to t4. In this case, when the timing generating unit 34 outputs the event signal after the time t3, the interaction frequency calculating unit 37 has calculated the interaction frequency per other party user based on the interaction history of the user and the other party user at the times t1 to t3.

Thus, the interaction frequency calculating unit 37 may calculate the interaction frequency using part or all items of data of the interaction history used to calculate an interaction frequency in the past.

Further, calculation of an interaction frequency will be described further using an example. For example, it is assumed that the timing generating unit 34 has outputted an event signal to the interaction history extracting unit 35 at times t1, t2, t3, t4, t5 and t6 in order. Consequently, for example, the interaction histories accumulated in the interaction history accumulating unit 36 include an interaction history of the user and the other party user up to the time t1 after the time t1, an interaction history of the user and the other party user up to the time t2 after the time t2, and an interaction history of the user and the other party user up to the time t3 after the time t3. Similarly, an interaction history of the user and the other party user up to the times t1 to t4 after the time t4, an interaction history of the user and the other party user up to the times t2 to t5 after the time t5, and an interaction history of the user and the other party user up to the times t3 to t6 after the time t6 are accumulated in the interaction history accumulating unit 36. According to these interaction histories, the interaction frequency calculating unit 37 calculates an interaction frequency. In addition, the interaction history accumulating unit 36 deletes the interaction history before the time t1 after the time t4, the interaction history at the times t1 to t2 after the time t5, and the interaction history at the times t2 to t3 after the time t6. That is, the interaction history accumulating unit 36 sequentially deletes data of the oldest interaction history among data of currently accumulated interaction histories every time an event signal is outputted after the time t4 (data of the oldest interaction history among data accumulated between event signals after the time t5 in particular). By so doing, while suppressing a capacity used by the interaction history accumulating unit 36 (while decreasing the capacity required by the interaction history accumulating unit 36), the interaction frequency calculating unit 37 can calculate an interaction frequency taking into account not only a latest interaction history but also past interaction histories. Consequently, the alienation degree determining unit 38 can more accurately determine the degree of alienation, and set an information disclosure range of the user to a more reasonable information disclosure range.

Naturally, the interaction history accumulating unit 36 may delete all interaction histories which have been accumulated so far every time a timing signal is outputted. In this case, the interaction frequency calculating unit 37 calculates an interaction frequency per other party user based on an interaction history of the user and another party user in a period of a latest timing signal to a previous timing signal.

Referring back to FIG. 6, the description continues. The alienation degree determining unit 38 determines the degree of alienation per other party user based on a value of an interaction frequency per other party user calculated by the interaction history accumulating unit 36 in step S15 (step S16). When, for example, the interaction history accumulating unit 36 calculates an interaction time cycle as an interaction frequency in step S15, the alienation degree determining unit 38 compares the calculated interaction time cycle and a threshold set in advance. The alienation degree determining unit 38 determines that a relationship between the user and the other party user is familiar when the cycle is shorter than this threshold, and determines that the relationship is alienated when the cycle is longer than this threshold.

The disclosure range setting operating unit 39 sets a disclosure range for disclosing user's information on an SNS in the information sharing unit 33 to the individual other party user based on the degree of alienation per other party user determined in step S16 (step S17). For example, the disclosure range setting operating unit 39 executes an operation for narrowing the set disclosure range disclosed by the information sharing unit 33 to the other party user whose degree of alienation from the user has changed from "familiar" to "alienated". For example, the disclosure range setting operating unit 39 rewrites the settings on the SNS to perform an operation of limiting information disclosure with respect to the other party user.

According to the above configuration and processing, the information disclosure system 10 can limit information disclosure of the user based on the interaction frequency of the user and a communicating party. The information disclosure system 10 can detect that a personal relationship becomes alienated by setting a quantitative index by calculating an interaction frequency. Consequently, it is possible to clarify the fact that the personal relationship has become "alienated", which the user hardly notices, and change the setting of the disclosure range based on this fact.

One of the most important elements to determine whether or not to disclose given information to a specific other party is a distance of a relationship such as whether a relationship with this other party is familiar or alienated. Generally, there is a user's request to more actively disclose information (to widen an information disclosure range) when the relationship is close, and limit the information disclosure range when the relationship is alienated. In this regard, to change the information disclosure range according to a situation, it is necessary to define an occurrence of an event for making the change.

For example, an event for that causes the information disclosure range to be widened, that is, an event in a real life which causes a relationship between the user and another party to become close, is an event where the user and the other party meet for the first time or the user and the other party participate together in a given project.

By contrast with this, when the information disclosure range is limited due to alienation, there is a problem that it is difficult to replace an event in the real life with an event for limiting information disclosure. For example, even when a project in which the user and the other part participate is terminated, the relationship between the user and the other party continues in private in some cases. In this case, an error occurs when it is regarded that the termination of the project alienates the relationship between the user and the other party. Thus, according to the methods of Patent Literature 1 to 4, it is not possible to appropriately change an information disclosure range in order to limit information disclosure when the relationship becomes alienated.

For example, a file management system disclosed in Patent Literature 1 sets per message a group as a group of other party users who information is disclosed. However, how to maintain the group settings as time passes is not disclosed.

A social network information managing method disclosed in Patent Literature 2, a communication controlling method of a Weblog system disclosed in Patent Literature 3 and social network electronic mail filtering disclosed in Patent Literature 4 can set groups based on a social graph. However, similar to Patent Literature 1, how to maintain the group settings as time passes is not disclosed.

In the information disclosure system 10 according to the second embodiment, the timing generating unit 34 transmits to the other party user who has become alienated an event signal for determining a time at which an information disclosure range is limited. When it is possible to transmit an event signal for limiting the information disclosure range, it is possible to automatically limit the information disclosure range according to a predetermined algorithm accordingly. Consequently, it is possible to prevent information from unintentionally leaking.

In addition, the disclosure range setting operating unit 39 may notify the user (user terminal 20) of whether or not to limit information disclosure according to the set information disclosure range, and limit the set information disclosure when the user approves this notice. Consequently, it is possible to limit the information disclosure range to other party users who have become alienated as time passes.

In the second embodiment, the information disclosure server 30 can execute the following processing as Examples. In addition, common points of contents of processing executed by each unit of the information disclosure server 30 and contents of the above-described processing will be optionally omitted in the following Examples. The same also applies to the descriptions of the third to fifth embodiments.

Example 1

An interaction log unit 32 obtains log information used for an input, from a region of an information disclosure server 30 which stores received mails and sent mails of a user terminal 20. In addition, the user terminal 20 stores logs of received mails and sent mails in the information disclosure server 30 on a regular basis.

In addition, when an information disclosure system 10 is a system related to an SNS, the interaction log unit 32 may store mails received and sent between a user and another party user on the SNS.

An interaction history extracting unit 35 refers to dates on which mails were sent to and received from the other party user indicated in From at a header portion of the received mail and To of the sent mail stored in the interaction log unit 32. Consequently, the interaction history extracting unit 35 can extract interaction history information of the mails exchanged between the user and a specific other party user. An interaction history accumulating unit 36 accumulates interaction history information of the mails extracted by the interaction history extracting unit 35. An interaction frequency calculating unit 37 can calculate an interaction frequency which is based on mail communication, based on information accumulated in the interaction history accumulating unit 36. An alienation degree determining unit 38 determines whether or not users are alienated based on the interaction frequency which is based on this mail communication as frequency information of the interaction between the users.

A disclosure range setting operating unit 39 sets an information disclosure range of the user with respect to the other party user based on processing of the alienation degree determining unit 38. Thus, the information disclosure system 10 can set the information disclosure range of the user with respect to the other party user corresponding to the degree of familiarity of the user and the other party user based on a mail transmission/reception history of the user and the other party user.

The interaction frequency calculating unit 37 may calculate an interaction frequency by determining that the sent and received mails have a uniformly same communication value.

Alternatively, the interaction frequency calculating unit 37 may calculate an interaction frequency by applying a different weight to an interaction frequency of communication according to a mail type.

For example, the interaction frequency calculating unit 37 can apply more weight to a mail value such that the interaction frequency becomes higher when mail communication is bidirectionally performed between the user and the other party user than when unilateral mail communication is performed. In other words, the interaction frequency calculating unit 37 can set a communication value such that the alienation degree determining unit 38 determines that a relationship between the user and the other party user is more familiar when bidirectional mail communication is frequently performed between the user and the other party user than when unilateral mail communication is performed. A specific example where a weight is applied to a mail will be described below.

In this example, the alienation degree determining unit 38 determines that connection between the user and the other party user is familiar when communication having a value of "10" or more was performed between the user and the other party user in one month. By contrast with this, the alienation degree determining unit 38 determines that the user and the other party user are alienated when communication having a value less than "10" was performed between the user and the other user in one month.

In this regard, the interaction frequency calculating unit 37 sets "1" to a value of a sent mail sent by the user and "1" to a value of a received mail received by the user (no reply mail to the sent mail or the received mail was received in this regard). Further, the interaction frequency calculating unit 37 sets "10" as a total value of a sent mail sent by the user and a received mail received by the user when the user received the received mail in response to the sent mail sent by the user. This value is five times as much as a value of "2" obtained by summing values obtained when two individual sent mails were sent or two individual received mails were received. That is, the interaction frequency calculating unit 37 determines that an interaction having a five-fold interaction frequency was performed when a mail was sent by a user or the other party user and a mail was returned in response to this mail by the other party user or the user compared to when the user sent only two sent mails to a specific user or a case where the user received two received mails.

In this regard, in an communication in which a mail was sent by the user or the other party user and a mail was returned by the other party user or the user in response to this mail once in one month, a total value of this communication is "10". This value is the same as a threshold in the alienation degree determining unit 38, and therefore the alienation degree determining unit 38 determines that the connection between the user and the other party user is familiar.

However, when the user sent two mails to the other party user in one month or when the user received two mails from the other party user in one month, a total value of this communication is "2". This value is less than the threshold in the alienation degree determining unit 38, and therefore the alienation degree determining unit 38 determines that the user and the other party user are alienated.

The above method is based on an idea that, when bidirectional mail communication is frequently performed between the user and the other party user, it is possible to determine that the relationship between the user and the other party user is familiar. To put it in another way, this method is based on an idea that, when it comes to a relationship where one user of two users unilaterally performs mail communication like direct mails with respect to the other user, it is possible to regard that a relationship between both of the users is "alienated".

According to this method, it is possible to calculate a lower interaction frequency in case of such a unilateral relationship between users. Consequently, the alienation degree determining unit 38 can more reliably determine that the relationship between the users is "alienated", and, consequently, the disclosure range setting operating unit 39 can set a narrow disclosure range of user's information. Consequently, the information disclosure system 10 can limit information to disclose to parties who the user feels "alienated" from. To put it in another way, when users perform bidirectional communication, the disclosure range setting operating unit 39 can set a wide disclosure range of user's information. Thus, the information disclosure server 30 can widely disclose the user's information to parties who the user feels "familiar" with.

In addition, a mail value may be increased (a mail value is set such that the degree of familiarity is determined to be high) when the user sends a mail to the other party user compared to when the user receives a mail from the other party user. This is based on an idea that the user regards the other party user to be more "familiar" when the user voluntarily sends a mail as an action for the other party user than when the user receives a mail as an action from the other party user. Consequently, the information disclosure server 30 can set a wider range of information to disclose to parties who the user feels "familiar" with.

Further, the interaction frequency calculating unit 37 may apply more weight to a value of a mail such as "a sent mail to be newly sent" than to "a sent mail as a reply to a received mail" so that the interaction frequency becomes higher. In this regard, the "sent mail to be newly sent" refers to a sent mail to be sent to another party user for new business instead of a sent mail to be sent as a reply to a received mail arriving from the other party user. In other words, even a mail which is sent to the other party user for the second time or after and which is not a reply mail is "a sent mail to be newly sent".

For example, the interaction frequency calculating unit 37 may set "1" as a value of "a sent mail as a reply to a received mail" sent by the user, and "5" as a value of "a sent mail to be newly sent" by the user. In this case, the interaction frequency calculating unit 37 determines that an interaction having a five-fold interaction frequency was performed when the user sent "a sent mail to be newly sent" compared to when the user sends "a sent mail as a reply to a received mail". In addition, in this example, the alienation degree determining unit 38 determines that a connection between the user and the other party user is familiar when communication having a value equal to or more than "10" was performed between the user and the other party user in one month. By contrast with this, the alienation degree determining unit 38 determines that the user and the other party user are alienated when communication having a value less than "10" was performed between the user and the other party user in one month.

In this case, when the user sent two "sent mails to be newly sent" to the other party in one month, a total value of this communication is "10". This value is the same as the threshold in the alienation degree determining unit 38, and therefore the alienation degree determining unit 38 determines that a relationship between the user and the other party user is familiar.

However, when the user sent "sent mails as a reply to a received mail" to the other user twice in one month, the total value of this communication is "2". This value is less than the threshold in the alienation degree determining unit 38, and therefore the alienation degree determining unit 38 determines that the user and the other party user are alienated.

This method is based on an idea that the user regards the other party user as more "familiar" when the user voluntarily sends a mail as an action for the other party user than when the user sends a mail as a response to an action from the other party user. This is because it is thought that an action of the user to send a mail to the other party user reflects a user's strong will when the former is compared with the latter. When the user voluntarily sends a mail as an action for another user, the alienation degree determining unit 38 can more reliably determine that a relationship between the user and the other user is "familiar". Consequently, the disclosure range setting operating unit 39 can set a wide disclosure range of user's information. Consequently, the information disclosure system 10 can set a wide range of information to disclose to the other party who the user feels "familiar" with, so that it is possible to encourage a personal relationship to become more familiar.

Further, the interaction frequency calculating unit 37 may apply more weight to a value of a mail such as "a received mail as a reply to a sent mail" than to "a received mail to be newly received" so that an interaction frequency becomes higher. In this regard, "the received mail to be newly received" refers to a received mail received by the user from the other party user for new business instead of a received mail to be received as a reply to a sent mail sent by the user. In other words, even a mail which is sent from the other party user to the user for the second or subsequent time and which is not a reply mail and is received, is "a received mail to be newly received".

For example, a value of "a received mail to be newly received" from the other party user may be "1", and a value of "a received mail as a reply to a sent mail" may be "5". In this case, the interaction frequency calculating unit 37 determines that an interaction having a five-fold interaction frequency was performed when "a received mail as a reply to a sent mail" was sent compared to when the user received "a received mail to be newly received". In addition, in this example, the alienation degree determining unit 38 determines that a connection between the user and the other party user is familiar when communication having a value equal to or more than "10" was performed between the user and the other party user in one month. By contrast with this, when communication having a value less than "10" was performed between the user and the other party user in one month, the alienation degree determining unit 38 determines that the user and the other party user are alienated.

In this case, a total value of this communication is "10" when the user received two "received mails as a reply to a sent mail" from the other party user in one month. This value is the same as the threshold in the alienation degree determining unit 38, and therefore the alienation degree determining unit 38 determines that a relationship between the user and the other party user is familiar.

However, a total value of this communication is "2" when the user received "received mails to be newly received" from the other party user twice in one month. This value is less than the threshold in the alienation degree determining unit 38, and therefore the alienation degree determining unit 38 determines that the user and the other party user are alienated.

This method is based on an idea that the user regards the other party user as more "familiar" when the user receives from the other party a response to a mail sent by the user (receives a reply to the mail sent by the user) than when the other party user unilaterally makes an action for the user (the other party user sends a mail). It is thought that the former is bidirectional communication and the latter is unilateral communication. Thus, the alienation degree determining unit 38 can more reliably determine that a relationship between a user and the other user is "familiar" when the user receives a mail as a response from the other user. Consequently, the disclosure range setting operating unit 39 can set a wide disclosure range of user's information. Consequently, the information disclosure system 10 can set a wide range of information to disclose to the other party who the user feels "familiar" with, so that it is possible to encourage a personal relationship to become more familiar.

In addition, in the above Example 1, the interaction frequency calculating unit 37 needs to analyze whether a mail sent by the user is a "sent mail as a reply to a received mail" or "a sent mail to be newly sent". Similarly, the interaction frequency calculating unit 37 needs to analyze whether a mail received by the user is a "received mail as a reply to a sent mail" or "a received mail to be newly received". In this regard, the interaction frequency calculating unit 37 may determine whether or not a reply to a given mail was made by referring to a Message-ID of another mail.

Alternatively, when the user receives a mail from the other party user and sends a mail to the same other party user within a predetermined time after receiving the mail, the interaction frequency calculating unit 37 may analyze that this sent mail is "a sent mail as a reply to a received mail". Similarly, when the user sends a mail to the other party user and receives a mail from the same other party user within a predetermined time after sending the mail, the interaction frequency calculating unit 37 may analyze that this received mail is "a received mail as a reply to a sent mail". This "predetermined time" can be arbitrarily set to one hour, one day, one week or the like by the user or the information disclosure system 10.

In the Example 1, when analyzing a sent mail sent from the user, the interaction frequency calculating unit 37 may apply a weight to a mail value according to in what way the user sent the mail to the other party user who the user sent the mail to.

For example, the interaction frequency calculating unit 37 may multiply the above mail value with a weight coefficient "1" when the other party user who the user sent the mail to is included in "To" of the sent mail, and multiply the above mail value with a weight coefficient "0.3" when the other party user who the user sent the mail to is included in "Cc" or "Bcc" of the sent mail. In case of the former, a mail value rises, and, in case of the latter, a mail value lowers.

This method is based on an idea that the degree of familiarity of the user with the other party user differs when the other party user is written in "To" and when the other party user is written in "Cc" or "Bcc". It is thought that the former is a case where the user recognizes the other party user as "the other party who the user transmits information written in a mail to" and the latter is a case where the user recognizes the other user as "the other party who the user wishes to check information written in the mail". Thus, the alienation degree determining unit 38 determines that an interaction frequency is lower when the other party is included in "Cc" or "Bcc" than when the other party user is included in "To".

In addition, according to the above method of applying a weight to a mail value, a value of a weight coefficient may be other values. For example, the interaction frequency calculating unit 37 may multiply the above mail value with a weight coefficient "1" when the other party user who the user sent the mail to is included in "To" of the sent mail, and multiply the above mail value with the weight coefficient "0.5" when the other party user who the user sent the mail to is included in "Cc" or "Bcc" of the sent mail.

Even when the other party user who the user sent the mail to is included in "To" of the sent mail, the interaction frequency calculating unit 37 may apply a different weight to a mail value depending on whether the sent mail is a broadcast mail or an advertisement mail for transmitting information to a large number of people or a mail for transmitting information to a small number of people. The former mail includes, for example, a mail in which a great number of (e.g. several tens of) mail addresses are written in "To" in parallel or a mail which is distributed at one time using a mailing list. The latter mail includes, for example, a mail whose communicating parties included in "To" of the mail are only one person or several people including the other party user. For example, the interaction frequency calculating unit 37 may multiply the above mail value with a weight coefficient "0.6" in case of a broadcast mail, and multiply the above mail value with a weight coefficient "1" in case of a mail for transmitting information to a small number of people. In the case of the former, the mail value is lowered, and, in the case of the latter, the mail value is raised.

The above method is based on an idea that, even in case where the other party user is written in the same "To" that the user is written in, the degree of familiarity of the user and the other party user is higher when information is transmitted to a small number of people than when an advertisement mail or a broadcast mail is sent. It is thought that while the user has a will to clearly notify the other party user of the user's will in the former case, the user recognizes the other party user as part of a large number of mail sending target people in the latter case. Thus, the alienation degree determining unit 38 determines that an interaction frequency is higher in the case of a mail for transmitting information to a small number of people than in the case of a sent mail for transmitting information to a large number of people. Consequently, the disclosure range setting operating unit 39 can set more accurate information to disclose according to user's estimation of the other party user who the user interacts with.

The interaction frequency calculating unit 37 sets a threshold to the number of mail addresses to be written in "To" of a sent mail, and determines that the sent mail is a mail for transmitting information to a large number of people when the number of mail addresses actually written in "To" of the sent mail is the threshold or more. When the number of mail addresses actually written in "To" of the sent mail is less than the threshold, the interaction frequency calculating unit 37 determines that the sent mail is a mail for transmitting information to a small number of people. This threshold may be, for example, "10" or "30". Alternatively, when a mail address written in "To" of a sent mail is a dedicated address for sending a mail to a large number of people, such as a broadcast mail or an advertisement mail, the interaction frequency calculating unit 37 may determine that this mail is a mail for transmitting information to a large number of people.

Similar to the sent mail, the interaction frequency calculating unit 37 may apply a weight to a mail value according to in what way the other party user sent a mail when analyzing a received mail received from the other party user. For example, a value of a received mail may be lowered more when the other party user wrote the user in "Cc" or "Bcc" of a received mail compared to when the other party user wrote the user in "To" of the received mail. This method is based on an idea that the degree of familiarity of the other party user with the user when the other party user writes the user in "To" of a mail differs from when the other party user writes the user in "Cc" or "Bcc".

Even when the other party user writes the user in "To" of a sent mail, the interaction frequency calculating unit 37 may apply a weight to a mail value which differs according to whether a sent mail is a broadcast mail or an advertisement mail for transmitting information to a large number of people, or a mail for transmitting information to a small number of people. In the case of the former, the mail value is lowered, while in the case of the latter, the mail value is raised. The details of the weighting are described as mentioned above, and therefore will not be described.

In addition, according to the above method, a weight is applied to a mail value by multiplying an original mail value with a weight coefficient. However, a weight may be applied to a mail value by adding a weight coefficient to the original mail value.

In addition, in the above Example 1, the interaction frequency calculating unit 37 may apply a weight to a value so that an interaction frequency becomes higher when sentences in a mail are longer. When sentences of a mail are greater than a predetermined information amount, a weight may be applied to a mail value by multiplying or adding an appropriate weight coefficient to a value of a mail similar to the Example 1. In this regard, the interaction history extracting unit 35 also extracts information of lengths of the sentences of the mail, from an interaction log, associates the information with information of the other party user and stores the information as an interaction history in the interaction history accumulating unit 36. When the sentences of the mail are longer, it is highly likely that the degree of communication between the user and the other party user is high and thus a relationship is familiar.

In this regard, when extracting information of the lengths of the sentences of the mail from the interaction log, the interaction history extracting unit 35 may determine whether or not the sentences of the mail are citations, extract only sentences which are not the citations as effective sentences and extract information on the lengths of the sentences. When a received mail or a sent mail is a reply mail to a previous mail, the cited previous mail is included in sentences of this mail in some cases. In this case, the cited sentences are not sentences written in accord with the user's will by the user who sent the mail. A portion of a mail in which the user performs substantial communication with a user of a sending destination is a portion which is not a cited portion of a mail. Consequently, the interaction history extracting unit 35 extracts a portion which is not a cited portion of a mail and extracts the lengths of the sentences, so that the interaction frequency calculating unit 37 can calculate an interaction frequency which more appropriately reflects an actual situation of communication between the users. Consequently, the disclosure range setting operating unit 39 can set a disclosure range which more appropriately reflects an actual situation of communication between the users.

In addition, the interaction history extracting unit 35 determines whether or not sentences of a mail are citations by, for example, detecting quotation marks (e.g. ">") indicating citations in the mail.

Example 2

An interaction log unit 32 obtains log information used for an input from a region of an information disclosure server 30 which stores an activity history of a user on an SNS. In this regard, the activity history includes an exchange of messages for limited other party users on the SNS, sentences of a blog or the like, messages, comments on the messages and the like for specific people or a larger number of unspecific people. Further, the activity history may include use of means (e.g. means such as a "like!" button of Facebook (trademark) for notifying that sentences of a blog of another person or messages have been read.

An interaction history extracting unit 35 refers to a date at which direct communication was performed between a user and the other party user on a SNS in the past from the activity history stored in the interaction log unit 32. In this regard, the direct communication includes an exchange of messages performed between the user and the other party user, comments of the other party user or the user made on messages of the user or the other party user, and use of means for notifying that messages of the user or the other party user have been are read by the other party user or the user. Consequently, the interaction history extracting unit 35 can extract interaction history information related to direct communication performed between the user and a specific other party user on the SNS. An interaction history accumulating unit 36 accumulates interaction history information on the SNS extracted by the interaction history extracting unit 35. An interaction frequency calculating unit 37 can calculate an interaction frequency on the SNS based on information accumulated in the interaction history accumulating unit 36. An alienation degree determining unit 38 determines whether or not users are alienated based on this interaction frequency on the SNS as frequency information of an interaction between the users.

A disclosure range setting operating unit 39 sets an information disclosure range of the user with respect to the other party user based on processing of the alienation degree determining unit 38. Thus, an information disclosure system 10 can set an information disclosure range of the user with respect to the other party user according to the degree of familiarity of the user and the other party user based on a direction communication history of the user and the other party user on the SNS.

In this regard, the interaction frequency calculating unit 37 can apply a weight to a mail such that the interaction frequency becomes higher when bidirectional direct communication was performed between the user and the other party user than when unilateral communication was performed. This is because the alienation degree determining unit 38 determines that a relationship between the user and the other party user is more familiar when bidirectional communication is frequently performed between the user and the other party user than when unilateral communication is performed.

When, for example, the user released a message to only the other party user or a specific group including the other party user on the SNS, the interaction frequency calculating unit 37 determines that unidirectional direction communication was performed. In this regard, when the other party user made a comment on this message or made a reply as a message, the interaction frequency calculating unit 37 determines that bidirectional direct communication was performed. Even when the other party user notifies the user that the other party user has read this message, the interaction frequency calculating unit 37 determines that the bidirectional direct communication was performed.

Similar to the above determination method, this method is based on an idea that, when bidirectional communication is frequently performed between the user and the other party user, it is possible to determine that the relationship between the user and the other party user is familiar. Consequently, an information disclosure system 10 can limit information to disclose to the other party who the user feels is "alienated".

Further, the interaction frequency calculating unit 37 may apply more weight to a value of communication such as "a message or a comment to be newly written or means for notifying the message has been read" than to "a message or a comment as a reply to a message or a comment" so that the interaction frequency becomes higher. In this regard, "a message or a comment to be newly written or means for notifying that a message has been read" refers to a message or a comment to be sent to the other party for new business instead of a reply (response) to a message or a comment from the other party user. Similar to the Example 1, this method is based on an idea that the user regards the other user as more "familiar" when the user voluntarily makes a message or a comment as an action for another user than when the user makes a message or a comment as a response to an action from another user.

Further, the interaction frequency calculating unit 37 may apply more weight to a value of communication such as "a message or a comment as a reply to a message or a comment" than to "a message or a comment to be newly written or means for notifying that a message has been read" so that the interaction frequency becomes higher. In this regard, "a message or a comment to be newly written or means for notifying that a message has been read" refers to a message or a comment written by the other party user to the user for new business instead of a message or a comment made by the other party user as a reply to a message or a comment written by the user. Similar to the Example 1, this method is based on an idea that the user regards the other user more as "familiar" when the other party user responds to a message or a comment made by the user than when the other user unilaterally makes an action for the user.

In addition, the interaction frequency calculating unit 37 may calculate an interaction frequency by determining that communicating means between the user and the other party user (exchange of messages or means for notifying that a comment or a message has been read) has the uniformly same communication value. Alternatively, the interaction frequency calculating unit 37 may calculate an interaction frequency by applying a weight to a communication value that differs according to a type of communicating means.

Example 3

A user terminal 20 and another party terminal 21 may execute a voice call using telephones. In this regard, an information disclosure server 30 is connected with at least one of the user terminal 20 and the other party terminal 21, and can record a history of voice calls of the user terminal 20 and the other party terminal 21 when the user terminal 20 and the other party terminal 21 execute data communication. Alternatively, the information disclosure server 30 is included in a base station side communication network including a base station which covers the user terminal 20 and the other party terminal 21, and may record a history of voice calls of the user terminal 20 and the other party terminal 21 when the voice call is executed.

In this case, an interaction log unit 32 obtains log information used for an input from a region of the information disclosure server 30 which stores the history of the voice calls of the user terminal 20 and the other party terminal 21. In this regard, the voice call history refers to information which makes it possible to specify a call time of the user terminal 20 of the user and another party user name of this call.

An interaction history extracting unit 35 refers to a date and time on which a call was made between the user and the other party user based on the voice call history stored in the interaction log unit 32. Consequently, the interaction history extracting unit 35 can extract history information of a voice call between the user and a specific other party user. An interaction history accumulating unit 36 accumulates the history information of the voice calls extracted by the interaction history extracting unit 35. An interaction frequency calculating unit 37 can calculate an interaction frequency of voice calls based on information accumulated in the interaction history accumulating unit 36. The alienation degree determining unit 38 determines whether or not the users are alienated based on this interaction frequency of the voice calls as frequency information of an interaction between the users.

When, for example, the user and the other party user make a voice call, the interaction frequency calculating unit 37 may apply more weight to a voice call value such that the interaction frequency becomes higher when both of the users receive incoming calls than when one of the user and the other party user receives an incoming call from the other one of the user and the other party. In other words, the interaction frequency calculating unit 37 may set a communication value so that the alienation degree determining unit 38 is more likely to determine that a relationship between the user and the other party user is familiar when the user and the other party user frequently receive bidirectional incoming calls than when a unilateral incoming call is made. The details of setting the communication value are the same as those in the Example 1.

Similar to the Example 1, the above method is based on an idea that, when bidirectional incoming calls are made between the user and the other party user, it is possible to determine that a relationship between the user and the other party user is familiar. By contrast with this, according to this method, it is possible to calculate a low interaction frequency for such a unilateral relationship between users. Consequently, the alienation degree determining unit 38 can more reliably determine that the relationship between the users is "alienated", so that the disclosure range setting operating unit 39 can set a narrow disclosure range of user's information.

Further, when, although the other party terminal 21 received an incoming call from the user terminal 20 of the user, the other party user who received the incoming call could not make a voice call because of a phone message or a hold state (there was an incoming call which was not accompanied by a voice call), the information disclosure server 30 may record this history. Similarly, when, although the user terminal 20 received an incoming call from the other party terminal 21, the user who received the incoming call from the other party user could not make a voice call because of a phone message or a hold state (there was an incoming call which was not accompanied by a voice call), the information disclosure server 30 may record this history.

In this regard, it is thought that there are two types of situations where the user gives an incoming call from the user terminal 20 to the other party terminal 21. The first situation is that the other party terminal 21 gives to the user terminal 20 an incoming call which is not accompanied by a voice call, and, when the user gives an incoming call to the other party terminal 21 referring to an incoming call history of the user terminal 20, the user and the other party user make a voice call. The second situation is that, in a state where the other party user does not gives an incoming call which is not accompanied by a voice call in a predetermined period, the user gives an incoming call from the user terminal 20 to the other party terminal 21, and the user and the other party user make a voice call. Alternatively, the second situation is that, although the user received an incoming call which is not accompanied by a voice call from the other party user in a predetermined period, after this incoming call, a voice call was made from the user terminal 20 to the other party terminal 21 before a current incoming call.

In this case, it is possible to regard the former voice call as a response to the previous incoming call. This is because the other party user recognized that there was an incoming call from the user referring to the other party terminal 21, and the other party user made a return call. By contrast with this, it is possible to regard that the latter voice call was newly made. This is because it is thought that the user made a call to the other party user for independent business irrespectively of a previous incoming call from the other party user.

In this regard, the interaction frequency calculating unit 37 can apply more weight to a value of the latter voice call than to a value of the former voice call so that the interaction frequency becomes higher. While the former voice call can be regarded as a voice call made in accord with the other party user's will rather than in accord with the user's will, the latter voice call can be regarded as a voice call made in accord with the user's will.

Similar to the Example 1, this method is based on an idea that the user regards the other user as more "familiar" when the user voluntarily makes a voice call as an action for the other user than when the user makes a voice call as a response to an action of the other user. When the user voluntarily makes a voice call as an action for the other user, the alienation degree determining unit 38 can more reliably determine that a relationship between the users is "familiar". Consequently, the disclosure range setting operating unit 39 can widely set a disclosure range of the user's information.

Similarly, it is thought there are two types of situations where the other party user gives an incoming call from the other party terminal 21 to the user terminal 20. The first situation is that the user terminal 20 gives to the other party terminal 21 an incoming call which is not accompanied by a voice call, the other party user gives an incoming call to the user terminal 20 referring to the incoming call history of the other party terminal 21 and the user and the other party user make a voice call. The second situation is that, in a state where the user does not give an incoming call which is not accompanied by a voice call in a predetermined period, the other user gives an incoming call from the other party terminal 21 to the user terminal 20 and then the user and the other party user make a voice call. Alternatively, the second situation is a situation that, although the other party user received an incoming call which was not accompanied by a voice call from the user in the predetermined period, after this incoming call, a voice call was made from the user terminal 20 to the other party terminal 21 before a current incoming call.

In this case, it is possible to regard the former voice call as a response to a previous incoming call. This is because the other party user recognized that there was an incoming call from the user referring to the other party terminal 21, and the other party user makes a return a call. By contrast with this, it is possible to regard that the latter voice call was a newly made call. This is because it is thought the other party user made a call to the user for independent business irrespectively of a previous incoming call from the user.

In this regard, the interaction frequency calculating unit 37 can apply more weight to a value of the former voice call than to a value of the latter voice call so that the interaction frequency becomes higher. This is because, while the latter voice call can be regarded as a voice call made in accord with the other party user's will, the former voice call can be regarded as a voice call made in accord with the user's will rather than the other party user's will.

Similar to the Example 1, this method is based on an idea that the user can regard the other party user as more "familiar" when the other party user makes a response to an incoming call of the user than when the other party user unilaterally makes an action (incoming call) for the user. Thus, when the user makes a voice call as a response to the other user, the alienation degree determining unit 38 can more reliably determine that a relationship between the users is "familiar". Consequently, the disclosure range setting operating unit 39 can set a wide disclosure range of user's information.

In addition, in the above Example 3, the interaction frequency calculating unit 37 may apply a weight to a value such that the interaction frequency becomes higher when a voice call time is longer. When the voice call time is longer than the predetermined time, a weight may be applied to a value of a voice call by multiplying the value of the voice call with an appropriate weight coefficient similar to the Example 1. Alternatively, an appropriate weight coefficient may be added to the value of the voice call. In this regard, the interaction history extracting unit 35 also extracts information of a voice call time, from an interaction log, associates the information with information of the other party user, and stores the information as an interaction history in the interaction history accumulating unit 36.

Example 4

A user terminal 20 and another party terminal 21 may execute near field communication. According to the near field communication, when a terminal detects an approach of the other party terminal when terminals come close to each other, this detection triggers start of some communication operation. In this regard, the near field communication is performed based on standards such as, for example, infrared communication or Bluetooth (registered trademark).

An information disclosure server 30 stores in a predetermined region a time at which the near field communication was performed and log information including contents of the near field communication from the user terminal 20, the other party terminal 21 or both of the user terminal 20 and the other party terminal 21. An interaction log unit 32 obtains the log information used for an input from this region. An interaction history extracting unit 35 refers to a communicating party and a date on which communication was performed, from the log information stored in the interaction log unit 32. Consequently, the interaction history extracting unit 35 can extract interaction history information related to the near field communication performed between the user and a specific other party user. In other words, the interaction history extracting unit 35 can extract information of a behavior history indicating that the user and the other party user were at positions close to each other.

An interaction history accumulating unit 36 accumulates interaction history information related to the near field communication extracted by the interaction history extracting unit 35. An interaction frequency calculating unit 37 can calculate an interaction frequency of the near field communication based on the information accumulated in the interaction history accumulating unit 36. An alienation degree determining unit 38 determines whether or not the users are alienated based on the interaction frequency which is based on this near field communication as frequency information of an interaction between the users.

A disclosure range setting operating unit 39 sets an information disclosure range of the user with respect to the other party user based on the processing of the alienation degree determining unit 38. Thus, an information disclosure system 10 can set an information disclosure range of the user with respect to the other party user according to the degree of familiarity of the user and the other party user based on the interaction history information of the near field communication between the user and the other party user.

Example 5

A user terminal 20 and another party terminal 21 may each record a behavior history which makes it possible to specify position information of the user and another party user and time information, and store this behavior history in a predetermined region of an information disclosure server 30. In this regard, the user terminal 20 and the other party terminal 21 can record a behavior history which makes it possible to specify each user position information by, for example, a contained GPS (Global Positioning System) function.

An interaction log unit 32 obtains log information used for an input from a predetermined region. An interaction history extracting unit 35 refers to position information of the user and the other party user at each of time from a behavior history stored in the interaction log unit 32. In this regard, the interaction history extracting unit 35 determines whether or not the user and the other party user approach each other by overlaying and comparing the user's behavior history and the other party user's behavior history. The interaction history extracting unit 35 extracts information of a time when the user and the other party user approached each other or information of a period of time in which the user and the other party approached each other assuming that communication was performed between the users when the user and the other party user approached each other. In other words, the interaction history extracting unit 35 can extract information of a behavior history indicating that the user and the other party user were at positions close to each other.

In this regard, the interaction history extracting unit 35 determines whether or not the user and the specific other party user were at the same place at the same time according to a comparison performed by overlaying the behavior histories based on the position information. Upon this determination, the interaction history extracting unit 35 may determine whether both of the users approached each other by determining whether or not the position information of both of the users matched at a given specific time or in a short time. In addition, the "short time" refers to a period of time such as several minutes or several tens of minutes. In this regard, the user and the other party user approach each other only in this limited period, and therefore it is considered that the user and the other party user intentionally contact each other to perform communication.

There may a state where, when position information of the user and the other party user matches and positions of the user and the other party user are the same while the position information matches, the user and the other party user are accidentally at close positions for their own business (e.g. work), and communication is not performed between the users. In addition, it is highly likely that, when position information of the user and the other party user matches and positions of the user and the other party user are changing (both of the users are moving) while the position information matches, the user and the other party user are moving together and both of the users intentionally approach each other (that is, communication is performed between both of the users). Hence, when position information of the user and the other party user matches and the positions of the user and the other party user are the same while the position information matches, the interaction history extracting unit 35 may dare to determine that the user and the other party user do not approach each other on purpose.

However, there may also be a case where the user and the other party user perform communication without moving for a long period of time because of a conference or the like. Hence, the interaction history extracting unit 35 may determine that the user and the other party user approach each other even in this case. In other words, the interaction history extracting unit 35 may determine whether or not position information of the user and the other party user temporally continuously matched, and determine that both of the users approached each other and performed communication when there is a time zone in which the position information matched irrespectively of whether or not the position information of both of the users changed in this time zone.

Consequently, the interaction history extracting unit 35 can extract interaction history information indicating that the user and a specific other party user approached each other. The interaction history accumulating unit 36 accumulates interaction history information which is extracted by the interaction history extracting unit 35 and which relates to the approach. The interaction frequency calculating unit 37 can calculate the interaction frequency which is based on the approach, based on information accumulated in the interaction history accumulating unit 36. The alienation degree determining unit 38 determines whether or not the users are alienated based on this interaction frequency as frequency information of the interaction between the users.

In addition, in the above Example 5, the interaction frequency calculating unit 37 may apply a weight to a value such that the interaction frequency becomes higher when a period of time in which the user and the other party user approach each other is longer.

Example 6

A user terminal 20 may include a picture capturing or moving image capturing function. In this regard, the user terminal 20 stores captured image capturing data in a region of the user terminal 20, in an information disclosure server 30, or in a cloud configured by an information disclosure system 10. In addition, the image capturing data has image capturing date information recorded therein as at least meta data.

An interaction log unit 32 (data storage unit) obtains the image capturing data stored by the user terminal 20 as log information. An interaction history extracting unit 35 analyzes the image capturing data stored in the interaction log unit 32, and determines whether or not user and another party user are captured (included) as subjects. In this regard, an information disclosure server 11 stores data of faces of the user and the other party user and the like in advance, and the interaction history extracting unit 35 (extracting unit) determines whether or not the user and the other party user are captured as subjects of image capturing data based on the data of faces. When the user and the other party user are captured as the subjects of the image capturing data, the interaction history extracting unit 35 can determine that the user and the other party user interacted, and extract approach information indicating that the user and the other party were together at a predetermined time. An interaction history accumulating unit 36 accumulates (stores) the approach information extracted by the interaction history extracting unit 35. An interaction frequency calculating unit 37 can calculate an approach interaction frequency based on the information accumulated in the interaction history accumulating unit 36. An alienation degree determining unit 38 determines whether or not the users are alienated based on this interaction frequency as frequency information of the interaction between the users. As described above, the information disclosure system 10 can determine the degree of alienation of the user and the other party user based on the image capturing data, and set an appropriate disclosure range of user's information.

In addition, the user terminal 20 may detect in advance that the user and the other party user are captured as subjects of image capturing data. In this case, the information that the user and the other party are captured as the subjects of the image capturing data may be stored in a state where, for example, the information is associated as tag information with the image capturing data. The interaction history extracting unit 35 detects that the user and the other party user are captured as the subjects of the image capturing data by referring to this tag information.

In the above Example 5, in case where there is moving image capturing data in which the user and the other party user are captured as subjects, the interaction frequency calculating unit 37 may apply a weight to a value such that the interaction frequency of both of the users becomes higher when a time of this data is longer. Alternatively, the interaction history extracting unit 35 may detect a period of time in which the user and the other party user are captured together, and the interaction frequency calculating unit 37 may apply a weight to a value so that the interaction frequency of both of the users becomes higher when this period of time is longer.

Example 7

Processing may be executed by arbitrarily combining the Examples 1 to 6 described above.

When, for example, processing is executed by combining the Examples 1 to 3, information of received mails and sent mails of a user terminal 20, a user's behavior history on an SNS and a voice call history are stored in an interaction log unit 32.

An interaction history extracting unit 35 refers to a date and time on which communication was performed between the user and another party user, from the information stored in the interaction log unit 32. Consequently, the interaction history extracting unit 35 can extract history information of communication between the user and a specific other party user. An interaction history accumulating unit 36 accumulates the communication history information extracted by the interaction history extracting unit 35. An interaction frequency calculating unit 37 can calculate a communication interaction frequency based on the information accumulated in the interaction history accumulating unit 36. An alienation degree determining unit 38 determines whether or not the users are alienated based on this communication interaction frequency as frequency information of an interaction between the users.

In this regard, the interaction frequency calculating unit 37 may apply a weight to a communication value which differs according to a communication tool between the users. For example, the interaction frequency calculating unit 37 may apply more weight to a call made using a telephone than to a mail or other communication tools so that an interaction frequency becomes higher. That is, when communication is performed using a tool which secures reliable communication with the user, the interaction frequency calculating unit 37 applies a weight such that an interaction frequency becomes higher. Consequently, the alienation degree determining unit 38 can determine the degree of alienation which reflects an actual situation of communication between the users more reliably.

Further, the interaction frequency calculating unit 37 may determine whether communication performed by the user with respect to the other party user was performed as a response to communication from the other party user, or was newly performed by the user without communication from the other party user. The interaction frequency calculating unit 37 can apply more weight to the latter case than to the former case so that the interaction frequency becomes higher. This method is based on an idea that the user regards the other party user as more "familiar" when the user voluntarily performs communication as an action for the other party user than when the user performs communication as a response to an action from the other party user.

For example, it is assumed that the user gave an incoming call to the other party user one minute after the other party user sent a mail to the user, and made a voice call. In this case, it is thought that the voice call is a response to the mail which is sent to the user by the other party user. However, it is thought that, when, in a state where there was no mail sent or no comment on an SNS from the other party user to the user for a certain period of time, the user gave an incoming call to the other party user and made a voice call, the user voluntarily performed communication with the other party user. Hence, it is thought that the degree of familiarity of the user with the other party user is stronger in the latter case than in the former case.

Similarly, the interaction frequency calculating unit 37 may determine whether communication performed by the other party user with respect to the user was performed in response to communication from the user or was newly performed by the other party user without communication from the user. The interaction frequency calculating unit 37 can apply more weight to the former case than to the latter case so that an interaction frequency becomes higher. This method is based on an idea that the user regards the other user as more "familiar" when the other party user performs communication as a response to communication performed by the user than when the other party user unilaterally performs communication with the user.

It is thought that, when, for example, in a state where there was no mail sent or no comment on an SNS from the user to the other party user for a certain period of time, the other party user sent a mail to the user, the other party user performed communication with the user in accord with the other party user's will. However, it is thought that, when the other user sent a mail to the user 10 minutes after the user commented on the message of the other party user on the SNS, the sent mail was a response to the comment on the other party user from the user and bidirectional communication was performed with the user. Hence, the degree of familiarity of the user with the other party user is stronger in the latter case than in the former case.

In addition, it is possible to determine whether communication performed by the user with respect to the other party user is a response to communication previously performed by the other party user with respect to the user, based on a time interval of communication between both of the users. Similarly, it is possible to determine likewise whether or not communication performed by the other party user with respect to the user is a response to communication previously performed by the user with respect to the other party user.

While a history of communication between the user and the other party user performed on the SNS is stored in the interaction log unit 32 of an information disclosure server 30, a history of mail transmission/reception and a history of a call performed in the user terminal 20 are stored in the user terminal 20 first. In this case, the user terminal 20 stores the stored mail transmission/reception history and call history in the interaction log unit 32 of the information disclosure server 30 through a network. Consequently, an information share setting managing unit 31 also can set an information disclosure range of the user with respect to the other party user based on the mail transmission/reception history and the call history, too. In addition, storage processing performed by the user terminal 20 with respect to the interaction log unit 32 of the information disclosure server 30 can be automatically executed by, for example, application software mounted on the user terminal 20.

Alternatively, the user terminal 20 may obtain a history of communication between the user and the other party user stored in the interaction log unit 32 of the information disclosure server 30 and performed on the SNS. In this case, the user terminal 20 sets the information disclosure range of the user with respect to the other party user based on the obtained information, mail transmission/reception history and call history. A terminal side sets an information disclosure range in this way, a detailed description of which will be given in the following third embodiment.

Third Embodiment

The third embodiment of the present invention will be described below with reference to the accompanying drawings. A configuration example of an information disclosure system according to the third embodiment is as illustrated in FIG. 3. An information disclosure system 10 is a system which discloses user's information to each of other party users on an SNS including the user and a plurality of other party users (communicating parties) of the user as members.

Figure 7:
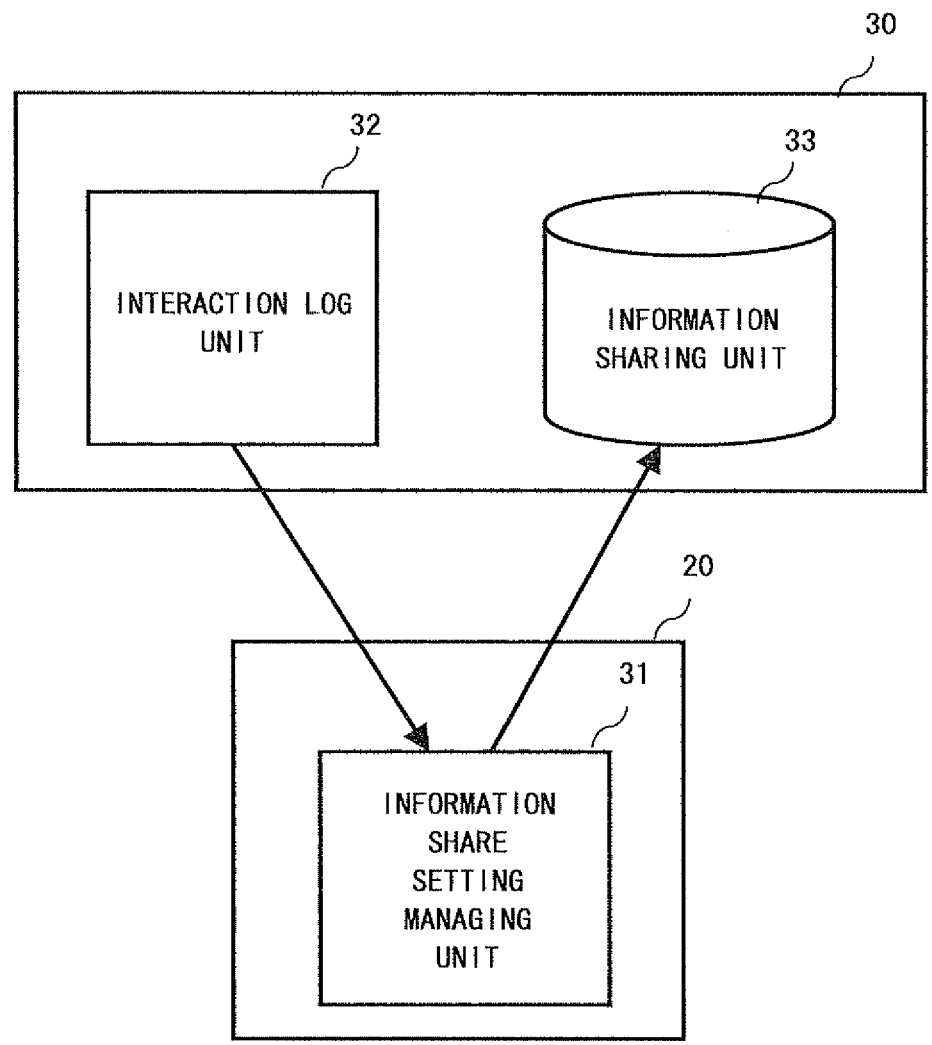
FIG. 7 is a block diagram illustrating a configuration example of a user terminal and an information disclosure server according to the third embodiment.

FIG. 7 is a block diagram illustrating a configuration example of a user terminal 20 and an information disclosure server 30. In the second embodiment, as illustrated in FIG. 4, the information disclosure server 30 includes an information share setting managing unit 31, an interaction log unit 32 and an information sharing unit 33. However, FIG. 7 illustrates that the information share setting managing unit 31 is included in the user terminal 20, and the interaction log unit 32 and the information sharing unit 33 are included in the information disclosure server 30.

A configuration of the information share setting managing unit 31 is as illustrated in FIG. 5. Similar to the second embodiment, the information share setting managing unit 31 includes a timing generating unit 34, an interaction history extracting unit 35, an interaction history accumulating unit 36, an interaction frequency calculating unit 37, an alienation degree determining unit 38 and a disclosure range setting operating unit 39.

Similar to the second embodiment, the interaction log unit 32 of the information disclosure server 30 stores logs related to interactions. When the timing generating unit 34 generates an event signal at a predetermined timing, the interaction history extracting unit 35 of the user terminal 20 extracts log information related to interacted information from the interaction log unit 32 of the information disclosure server 30, and stores the log information in the interaction history accumulating unit 36. When the interaction frequency calculating unit 37 receives the event signal from the timing generating unit 34 at the predetermined timing, it calculates an interaction frequency based on the interaction history stored in the interaction history accumulating unit 36. The alienation degree determining unit 38 determines the degree of alienation of the user and the other party user based on the interaction frequency calculated by the interaction frequency calculating unit 37.

In this connection, the alienation degree determining unit 38 outputs to the disclosure range setting operating unit 39 list information on other party users who are currently determined to be "familiar" although the degree of alienation had been previously determined to be "alienated". The other party users listed in the list information currently have limited access to user's important information in the information sharing unit 33, are familiar in terms of an actual personal relationship, and are other party users to which the user's important information may be disclosed.

The disclosure range setting operating unit 39 sets an information disclosure range to relax an access limitation of the other party users listed in the list information outputted from the alienation degree determining unit 38, to the user's information. Further, the disclosure range setting operating unit 39 transmits setting information for setting the information disclosure range of the information sharing unit 33 with respect to the other party user, to the information sharing unit 33 of the information disclosure server 30. The information sharing unit 33 of the information disclosure server 30 sets a range of user's information to disclose to the other party user based on the setting information transmitted from the user terminal 20. Thus, each unit of the information share setting managing unit 31 performs the same processing as that in the second embodiment.

In the third embodiment, the alienation degree determining unit 38 has determined at first that the relationship between the user and the other party user is "alienated", and then the information sharing unit 33 places a limitation on an information disclosure range for disclosing the user's information. More specifically, the other party user cannot browse important information of the user's information.

Subsequently, the alienation degree determining unit 38 determines that the relationship between the user and the other party user is "familiar", and then the information sharing unit 33 relaxes the limitation of the information disclosure range, so that the other party user can browse the user's important information.

Figure 8:
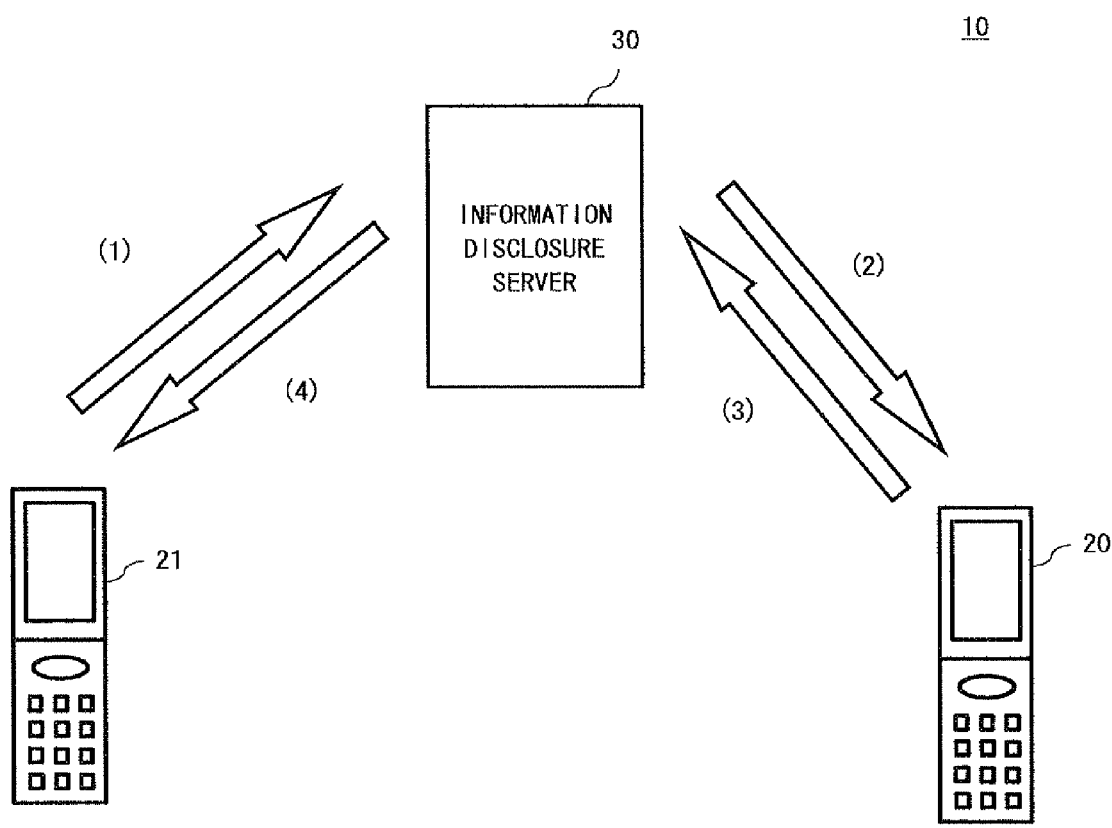
FIG. 8 is an image diagram illustrating how communication is performed in the user terminal, another party terminal and the information disclosure server according to the third embodiment.

FIG. 8 is an image diagram illustrating how communication is performed when limitation of the information disclosure range of the user is relaxed in the user terminal 20, another party terminal 21 and the information disclosure server 30.

First, as shown in FIG. 8, the other party user tries to access information (user's important information) to which an access is currently limited in the information sharing unit 33 of the information disclosure server 30 using the other party terminal 21 ((1) in FIG. 8). In this connection, the alienation degree determining unit 38 has previously determined that the degree of alienation of the user and the other party user is "alienated". Hence, the disclosure range setting operating unit 39 sets the information sharing unit 33 to place a limitation on an access upon disclosure of user's information. Hence, an access limitation is placed on the user's important information.

More specifically, upon a previous determination, a first interaction frequency calculated by the interaction frequency calculating unit 37 based on the interaction history stored in the interaction history accumulating unit 36 before a first time is lower than a previously calculated interaction frequency. Hence, the disclosure range setting operating unit 39 sets the disclosure range to a first disclosure range narrower than a previously set disclosure range.

Then, the information disclosure server 30 notifies the user terminal 20 that an information access to limited information has been tried ((2) in FIG. 8). In addition, the information disclosure server 30 may notify the user terminal 20 of information indicating who is making an access.

In this case, the information share setting managing unit 31 of the user terminal 20 calculates an interaction frequency, and determines whether or not this interaction frequency exceeds a predetermined threshold. Thus, the degree of alienation of the user and the other party user is determined. The alienation degree determining unit 38 determines that the relationship between the user and the other party user is "familiar". The disclosure range setting operating unit 39 generates setting information for relaxing the limitation on the information disclosure range in the information sharing unit 33 based on this determination result of the alienation degree determining unit 38. The user terminal 20 transmits this setting information to the information sharing unit 33 of the information disclosure server 30 ((3) in FIG. 8).

The information sharing unit 33 relaxes the limitation on the information disclosure range of the user with respect to the other party user based on the setting information transmitted from the user terminal 20. That is, the information sharing unit 33 makes a setting to enable the other party user to browse user's important information by lifting an access limitation on the user's important information from the other party user. Consequently, the other party terminal 21 can obtain information which the other party terminal 21 has tried to access, from the information sharing unit 33 ((4) in FIG. 8). Consequently, the user's important information is disclosed to the other party terminal 21. The important information refers to, for example, information for personally specifying a user.

In other words, a second interaction frequency calculated by the interaction frequency calculating unit 37 based on an interaction history stored in the interaction history accumulating unit 36 before a second time after the first time is higher than the first interaction frequency. Thus, the disclosure range setting operating unit 39 sets a disclosure range to a second disclosure range wider than the first disclosure range.

As described above, the user terminal 20 can set a disclosure range of user's information to disclose to the other party user based on an interaction log of the user and the other party user.

The alienation degree determining unit 38 may output information of only other parties whose degrees of alienation have changed from "alienated" to "familiar" without outputting to the disclosure range setting operating unit 39 information of degrees of alienation of all target other party users who the user discloses information to. Similarly, the alienation degree determining unit 38 may output list information of other party users who have been currently determined to be "alienated" while the degrees of alienation of the other party users have been previously determined to be "familiar".

That is, upon current determination, the alienation degree determining unit 38 may output information of only target users whose degrees of alienation have changed since previous determination, to the disclosure range setting operating unit 39. The disclosure range setting operating unit 39 sets an information disclosure range with respect to each other party user according to this information. More specifically, the disclosure range setting operating unit 39 makes a setting of widening the information disclosure range of user's information of the information sharing unit 33 with respect to the other party users whose degrees of alienation have changed from "alienated" to "familiar". In contrast with this, the disclosure range setting operating unit 39 makes a setting of narrowing the information disclosure range of user's information of the information sharing unit 33 with respect to the other party users whose degrees of alienation have changed from "familiar" to "alienated".

Modified Example 1

A user terminal 20 may be provided with not only an information share setting managing unit 31 but also an interaction log unit 32. For example, the interaction log unit 32 stores a mail transmission/reception history, a voice call history and the like of the user terminal 20 and another party terminal 21. An interaction history extracting unit 35 extracts an interaction history from the histories, and accumulates the extracted history in an interaction history accumulating unit 36. An interaction frequency calculating unit 37 calculates an interaction frequency based on the accumulated history. An alienation degree determining unit 38 determines the degree of alienation of the user and the other party user based on the calculated interaction frequency. A disclosure range setting operating unit 39 transmits setting information for setting the information disclosure range, to an information sharing unit 33 included in an information disclosure server 30 based on the determined degree of alienation. Thus, the user terminal 20 can set a disclosure range of user's information to disclose to the other party user, based on an interaction log stored in the user terminal 20.

The above configuration is particularly effective when the user terminal 20 can record communication with the other party terminal 21 such that the user terminal 20 and the other party terminal 21 send and receive mails or make telephone calls. The user terminal 20 does not have to output an interaction log to the information disclosure server 30, so that it is possible to skip unnecessary processing of the information disclosure system 10, and simplify a configuration of an information disclosure server 11.

Modified Example 2

Further, when a user terminal 20 and another party terminal 21 execute direct communication, the user terminal 20 may include an information share setting managing unit 31, an interaction log unit 32 and an information sharing unit 33. The other party terminal 21 obtains user's information stored in the information sharing unit 33 upon communication with the user terminal 20. In this connection, the user terminal 20 sets an information disclosure range of the user's information in the information sharing unit 33 per each other party user to communicate with. The other party terminal 21 of the other party user, who the user has been determined to be "familiar" with, can obtain user's important information when communicating with the user terminal 20. In contrast with this, the other party terminal 21 of the other party user, who the user has been determined to be "alienated" from, cannot obtain user's important information when communicating with the user terminal 20. Thus, the user terminal 20 can set a disclosure range to user's information to disclose according to the degree of alienation of the user and the other party user.

Fourth Embodiment

A fourth embodiment of the present invention will be described below with reference to the accompanying drawings. A configuration example of an information disclosure system according to the fourth embodiment is as illustrated in FIG. 3. An information disclosure system 10 is a system which discloses user's information to each of other party users on an SNS including the user and a plurality of other party users (communicating parties) of the user as members.

In the fourth embodiment, a case where the number of information disclosure target other party users is, for example, two to three digits will be assumed. In this case, setting an information disclosure range of a user per each other party user according to the degree of alienation of a user and an individual other party user is laborious and unrealistic. Particularly, when there is a large number of other party users (e.g. several tens of people or several hundreds of people), the setting becomes more remarkably laborious and unrealistic.

Hence, in the fourth embodiment, an information share setting managing unit 31 creates a group according to the degree of familiarity in advance. Further, a disclosure range setting operating unit 39 sets an information disclosure range in group units, and an information sharing unit 33 discloses user's information to the other party users according to the set information disclosure range.

Figure 9:
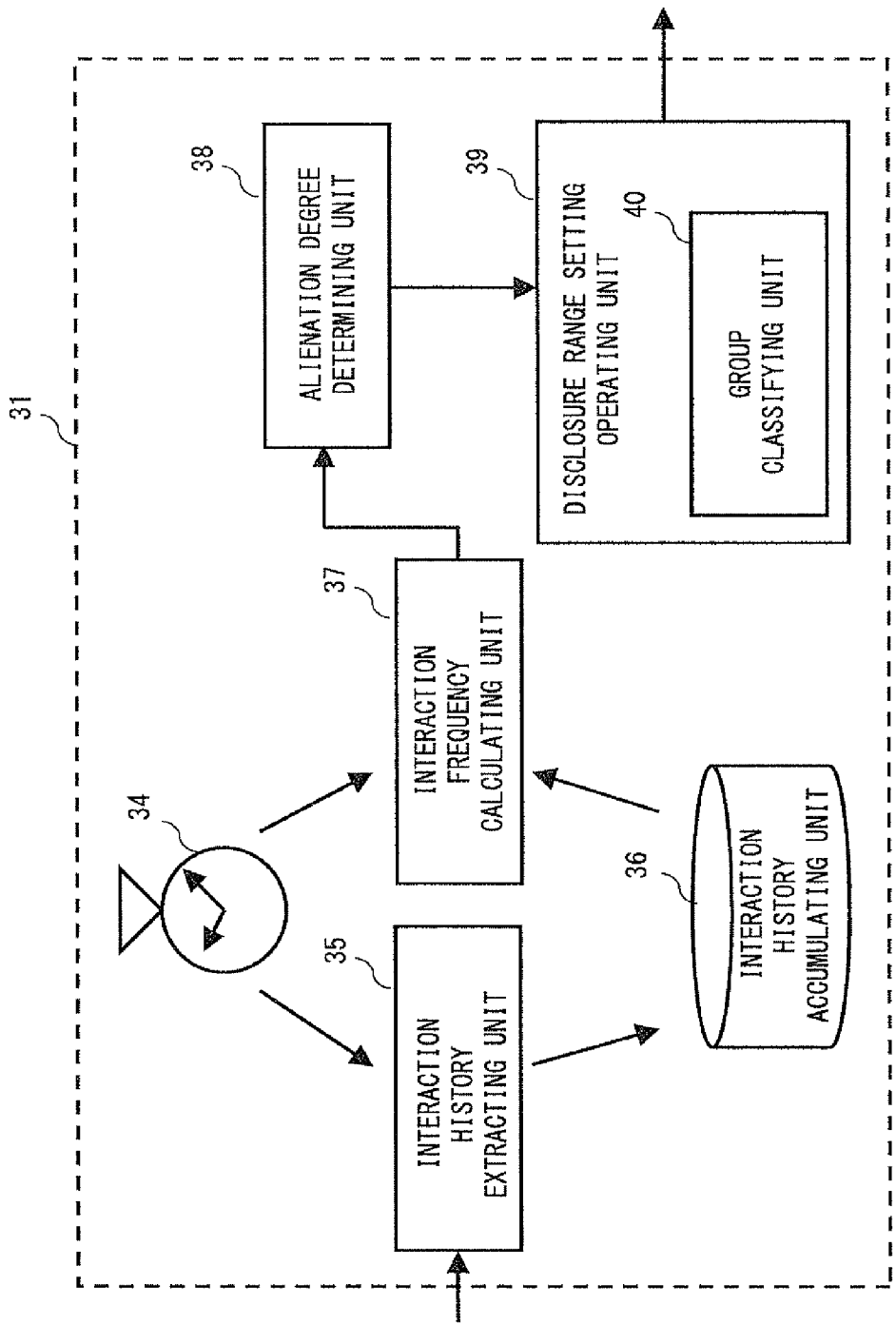
FIG. 9 is a block diagram illustrating a configuration example of the information share setting managing unit according to the fourth embodiment.

FIG. 9 is a block diagram illustrating a configuration example of the information share setting managing unit 31 included in an information disclosure server 30. In FIG. 9, the information share setting managing unit 31 differs from the information share setting managing unit 31 in FIG. 5 in that it includes a group classifying unit 40 in the disclosure range setting operating unit 39. The group classifying unit 40 stores a plurality groups classified according to degrees of alienation, and data of the other party users associated with each group.

In the following example, an alienation degree determining unit 38 determines the degree of alienation of the user and the other party user based on four types thereof: "familiar" (high), "a little familiar" (a little high), "a little alienated" (a little low) and "alienated" (low). Further, in the group classifying unit 40, a first group whose degree of alienation is "familiar", a second group whose degree of alienation is "a little familiar", a third group whose degree of alienation is "a little alienated" and a fourth group whose degree of alienation is "alienated" are set as group information. Further, the group classifying unit 40 stores information of other party users classified into (associated with) the first group to the fourth group, respectively. In addition, the number of groups is not limited to four, and may differ as long as the number is two or more (two, three and . . . ).

The disclosure range setting operating unit 39 sets information disclosure ranges to the first group to the fourth group, respectively. The disclosure range setting operating unit 39 sets wide information disclosure ranges in the information sharing unit 33 in an order of the first group, the second group, the third group and the fourth group. For example, the disclosure range setting operating unit 39 discloses all pieces of user's information to other party users belonging to the first group, and sets narrow information disclosure ranges in the information sharing unit 33 stepwise in order from the second group to the fourth group. In other words, when the information disclosure ranges set to the first group, the second group, the third group and the fourth group are a first disclosure range, a second disclosure range, a third disclosure range and a fourth disclosure range, respectively, the disclosure ranges narrow in order from the first disclosure range to the fourth disclosure range.

An alienation degree determining unit 38 outputs data of the determined degree of alienation of each other party user, to the disclosure range setting operating unit 39. In this regard, the disclosure range setting operating unit 39 refers to a group to which each other party user belongs in the group classifying unit 40, and compares the degree of alienation of each other party user from the user determined by the disclosure range setting operating unit 39.

For example, it is assumed that the degree of alienation of a specific other party user determined by the disclosure range setting operating unit 39 is "a little familiar", and a group to which this other party user belongs in the group classifying unit 40 is the third group. That is, the degree of alienation of this other party user is set to "a little alienated", and the information sharing unit 33 sets the information disclosure range corresponding to this degree of alienation.

In this case, the disclosure range setting operating unit 39 changes a group to which this other party user belongs in the group classifying unit 40, from the third group to the second group. That is, the disclosure range setting operating unit 39 allocates this other party user to a group to which the same degree of alienation as the degree of alienation determined by the alienation degree determining unit 38 is associated.

The disclosure range setting operating unit 39 executes an operation of changing the information disclosure range to the specific other user in the information sharing unit 33 according to the fact that the degree of alienation of the second group is "a little familiar". As described above, the information share setting managing unit 31 can change the information disclosure range in the information sharing unit 33 by changing a group to which other party users belong, according to a determination result of the alienation degree determining unit 38. Particularly when an interaction frequency calculated by an interaction frequency calculating unit 37 changes, the group classifying unit 40 can change a group to which other party users belong, based on this change, so that it is possible to change the information disclosure range in the information sharing unit 33.

In addition, there may also be a case where another party user whose degree of alienation has been determined by the alienation degree determining unit 38 is not registered in the group classifying unit 40. In this case, the disclosure range setting operating unit 39 associates the other party user with an appropriate group in the group classifying unit 40 based on the determination result of the alienation degree determining unit 38. When, for example, while the alienation degree determining unit 38 determines that the degree of alienation of the user and the other party user is "familiar", this other party user is not registered in the group classifying unit 40, the disclosure range setting operating unit 39 associates this other party user with the first group in the group classifying unit 40 and stores the other party user. Consequently, it is possible to classify the other party user into an appropriate group corresponding to the degree of alienation from the user, and set an appropriate information disclosure range to the other party user.

The alienation degree determining unit 38 can make a setting such that other party users belong to appropriate groups (i.e. set information disclosure ranges corresponding to other party users) by setting a plurality of thresholds (thresholds for determining alienation) of an interaction frequency. In this regard, the thresholds in the alienation degree determining unit 38 are "20", "15" and "10" in order of greatness and, when an interaction frequency calculated by the interaction frequency calculating unit 37 is higher, the degree of familiarity of the user and the other party user can be determined to be higher. In this case, when the interaction frequency of a specific other party user calculated by the interaction frequency calculating unit 37 is "20" or more, the alienation degree determining unit 38 determines that the degree of alienation of the user and the other party user is "familiar". When an interaction frequency of a specific other user calculated by the interaction frequency calculating unit 37 is less than "20" and "15" or more, the alienation degree determining unit 38 determines that the degree of alienation of the user and the other party user is "a little familiar". When an interaction frequency of a specific other party user calculated by the interaction frequency calculating unit 37 is less than "15" and "10" or more, the alienation degree determining unit 38 determines that the degree of alienation of the user and the other party user is "a little alienated". When an interaction frequency of a specific other party user calculated by the interaction frequency calculating unit 37 is less than "10", the alienation degree determining unit 38 determines that the degree of alienation of the user and the other party user is "alienated".

The disclosure range setting operating unit 39 determines whether or not a target other party user belongs to a group corresponding to the above determination of the alienation degree determining unit 38. When the other party user belongs to a group corresponding to the determination of the alienation degree determining unit 38, the disclosure range setting operating unit 39 does not execute change processing at all. When the other party user belongs to a group different from the determination of the alienation degree determining unit 38, the disclosure range setting operating unit 39 changes the group to which the other party user belongs in the group classifying unit 40, to a group corresponding to the determination of the alienation degree determining unit 38. This specific example of the change processing is as described above.

As described above, the lower the interaction frequency of another party user calculated by the interaction frequency calculating unit 37 is, the higher the degree of alienation of a group to which the other party user belongs can be set in the group classifying unit 40. For example, if it is assumed that another party user belongs to the first group (the group whose degree of alienation is "familiar") in the group classifying unit 40, the interaction frequency of the other party user calculated by the interaction frequency calculating unit 37 is "17". In this case, the interaction frequency of this other party user does not reach "20" of the maximum threshold in the alienation degree determining unit 38. Instead, it is "15" or more which is the second highest threshold. Hence, the disclosure range setting operating unit 39 changes the group to which this other party user belongs in the group classifying unit 40, from the first group to the second group (a group whose degree of alienation is "a little familiar"). In this case, a change in the degree of alienation of the user and the other party user is small, and therefore the group to which the other party user belongs is changed to the adjacent group.

In contrast with this, a case where the other party user belongs to the first group in the group classifying unit 40 and an interaction frequency of the other party user calculated by the interaction frequency calculating unit 37 is "8" will be assumed. In this case, the interaction frequency of this other party does not reach a minimum threshold of "10" in the alienation degree determining unit 38. Hence, the disclosure range setting operating unit 39 changes the group to which this other party user belongs from the first group to the fourth group (a group whose degree of alienation is "alienated") in the group classifying unit 40. In this case, the user and the other party user rapidly become alienated, and therefore the group to which the other party user belongs is changed to a group whose degree of alienation is significantly apart from that of the group to which the other party user had originally belonged. Thus, even when the other party users belong to groups whose degrees of familiarity are originally the same as each other, the groups can be different from each other to which the other party users change according to a change of the degree of alienation.

In this way, the information share setting managing unit 31 can set an information disclosure range in group units, so that, even when there are a large number of other party users, it is possible to efficiently set an information disclosure range according to the degrees of alienation of the user and the other party users.

Personal relationships between the other party users registered in the group classifying unit 40 and the user change as time passes, and therefore need to be maintained by changing settings. Further, accompanying a change in living environment such as work and families, the degree of alienation from even the same user changes as time passes. Therefore, a desirable information disclosure range changes per each other party user as time passes. As described above, data stored in the group classifying unit 40 needs to be intermittently maintained.

When the data stored in the group classifying unit 40 is maintained, an operation of adding another party user or deleting another party user is performed per each group. Adding other party users is usually triggered by an explicit event such as a new encounter or occurrence of a necessity to actively share information. In contrast with this, there is no explicit trigger to delete other party users. This is because, when a personal relationship with another party user becomes alienated, the degree of alienation usually increases gradually and there is no explicit event which causes this alienation. Hence, the user usually misses a timing to delete the other party user stored in the group classifying unit 40. Hence, as time passes, the number of other party users to disclose information to on an SNS, and the number of groups to which the other party users belong tend to increase always. Therefore, individually setting an information disclosure range to another party user is very laborious.

In the above fourth embodiment, even in the above case, an information disclosure range is set per each group according to the degree of alienation of the user and the other party user, so that it is possible to more easily set the information disclosure range.

In addition, the alienation degree determining unit 38 may output to the disclosure range setting operating unit 39 only information of other party users whose degrees of alienation have changed and data of the degrees of alienation without outputting all items of data of calculated degrees of alienation, similar to the third embodiment.

Fifth Embodiment

The fifth embodiment of the present invention will be described below with reference to the accompanying drawings. A configuration example of an information disclosure system according to the fifth embodiment is as illustrated in FIG. 3. An information disclosure system 10 is a system which discloses user's information to each of other party users on an SNS including the user and a plurality of other party users (communicating parties) of the user as members.

Figure 10:
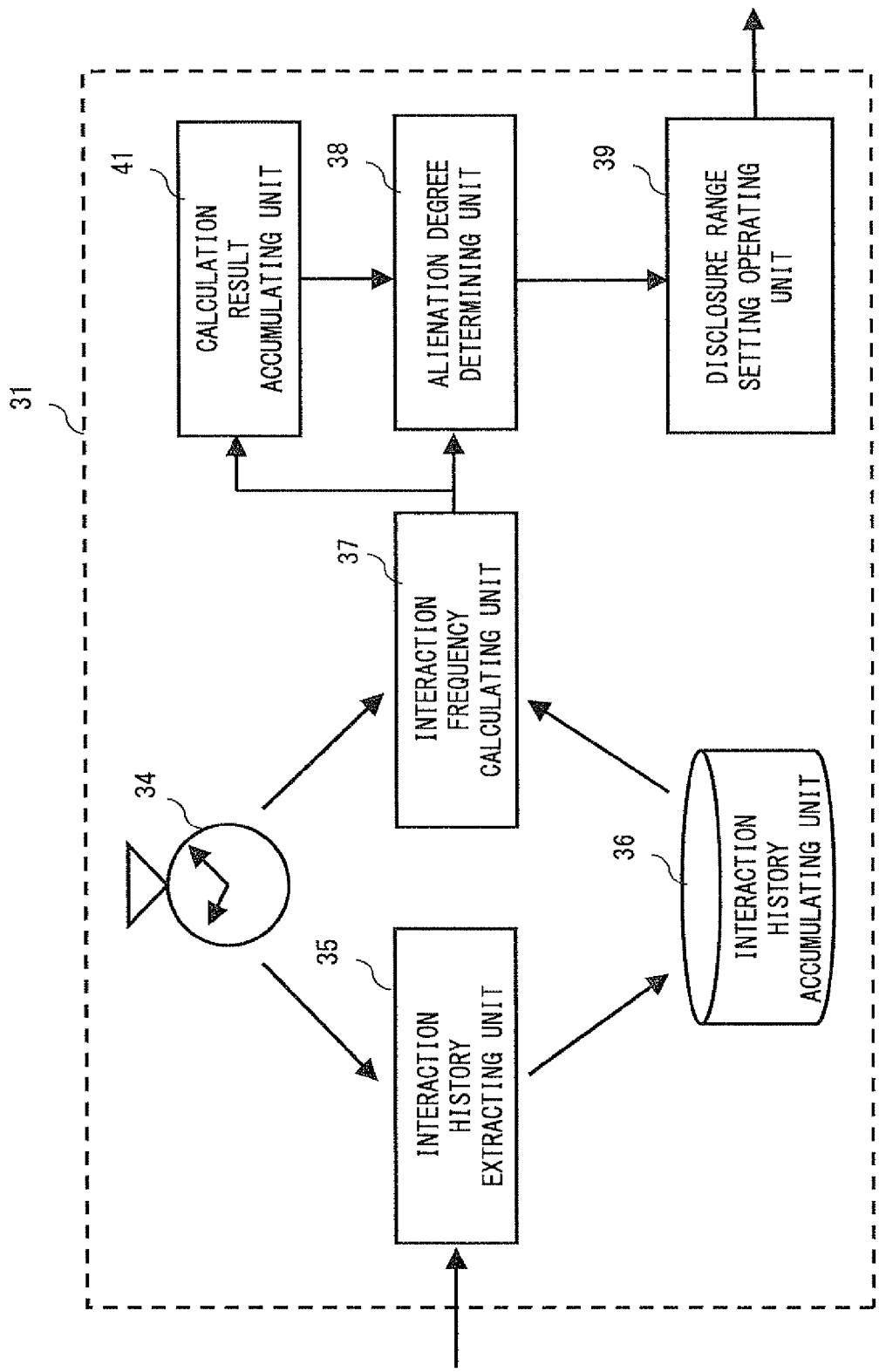
FIG. 10 is a block diagram illustrating a configuration example of an information share setting managing unit according to the fifth embodiment.

FIG. 10 is a block diagram illustrating a configuration example of an information share setting managing unit 31 included in an information disclosure server 30. In FIG. 10, the information share setting managing unit 31 differs from the information share setting managing unit 31 in FIG. 5 in that it additionally includes a calculation result accumulating unit 41. The calculation result accumulating unit 41 accumulates a calculation result of an interaction frequency of the user and another party user calculated by an interaction frequency calculating unit in the past (previously) for each other party user. When an interaction frequency calculating unit 37 calculates an interaction frequency of a given other party user, it outputs this calculation result not only to an alienation degree determining unit 38 but also to the calculation result accumulating unit 41. The calculation result accumulating unit 41 accumulates this outputted calculation result per each other party user.

When the alienation degree determining unit 38 determines the degree of alienation of the other party user, it determines the degree of alienation of a target other party user by referring to not only an interaction frequency currently calculated by the interaction frequency calculating unit 37 for the other party user but also an interaction frequency of the other party user accumulated in the calculation result accumulating unit 41. That is, the alienation degree determining unit 38 determines the degree of alienation of the target other party user based on both the current interaction frequency of the other party user and the past interaction frequency of the other party user.

In addition, the interaction frequency calculating unit 37 may output the calculation result only to the calculation result accumulating unit 41. The calculation result accumulating unit 41 accumulates the outputted calculation result and then outputs the accumulated calculation result to the alienation degree determining unit 38. Consequently, the alienation degree determining unit 38 can refer to the current interaction frequency of the other party user and the past interaction frequency of the other party user.

For example, the alienation degree determining unit 38 determines that the degree of alienation of another party user is "familiar" when an interaction frequency of another party user calculated by the interaction frequency calculating unit 37 is "20" or more, and determines that the degree of alienation of the other party user is "alienated" when the calculated interaction frequency of the other party user is less than "20". In addition, an interaction history accumulating unit 36 accumulates an interaction history of one day stored in an interaction log unit 32, and the interaction frequency calculating unit 37 determines the degree of alienation of the user and the other party user per each day according to information stored in the interaction history accumulating unit 36.

The calculation result accumulating unit 41 accumulates a calculated interaction frequency of the user and the other party user of the past month. In this regard, interaction frequencies accumulated in the calculation result accumulating unit 41 are all "20" or more.

In such a situation, a case where an interaction frequency of the user and the other party user calculated by the interaction frequency calculating unit 37 is "18" and is less than a threshold will be assumed. In this regard, the alienation degree determining unit 38 refers to not only "18" which is the current interaction frequency but also interaction frequencies accumulated in the calculation result accumulating unit 41.

The alienation degree determining unit 38 determines that "18" is less than the threshold referring to only "18" which is the current interaction frequency, and determines that the degree of alienation of the user and the other party user is "alienated". However, by comparing "18" of the current interaction frequency and "20" or more of all interaction frequencies in the past month, the alienation degree determining unit 38 determines that a situation that the current interaction frequency is less than the threshold is irregular. Hence, the alienation degree determining unit 38 determines that the degree of alienation of a target other party user is still "familiar" without changing the degree of alienation to "alienated". In this case, the disclosure range setting operating unit 39 keeps an information disclosure range of user's information with respect to the other party user as is without changing the information disclosure range.

According to the above processing, all interaction frequencies accumulated in the calculation result accumulating unit 41 may not be "20" or more. When most of the accumulated interaction frequencies (e.g. 70% or more) are "20" or more, the alienation degree determining unit 38 can execute the same processing as above. That is, the alienation degree determining unit 38 can execute the same processing as above when it is possible to statistically decide that a state where an interaction frequency is less than the threshold is irregular (a state is not a sustainable state and is a statistically abrupt state) referring to the interaction frequencies accumulated in the calculation result accumulating unit 41.

In addition, when a state where an alienation frequency calculated by the interaction frequency calculating unit 37 is less than the threshold continues for a certain period of time or more (e.g. the state continues for one week or more), the alienation degree determining unit 38 changes the degree of alienation of the target user from "familiar" to "alienated". According to this change, a disclosure range setting operating unit 39 sets a narrower information disclosure range of a user with respect to a target other party user than a previous information disclosure range. Thus, the alienation degree determining unit 38 changes a determination of the degree of alienation for the first time when it is possible to determine that the user and the other party user have become alienated for sure.

In addition, the above processing can be executed even when "alienated" and "familiar" are reversed.

When it comes to a personal relationship, even people who are usually familiar do not contact each other for a certain period of time under some circumstances. In contrast with this, even people who are usually alienated contact each other frequently during a certain period of time under some circumstances. When such an irregular situation occurs, if the alienation degree determining unit 38 immediately changes a determination result of the degree of alienation, an accurate reflection of the actual situation of a personal relationship cannot be shown. When the alienation degree determining unit 38 immediately changes the determination result of the degree of alienation, information to disclose to originally familiar people is limited and on the contrary information to disclose to originally alienated people is relaxed, and therefore a user's intention is not reflected in terms of the limitation of information disclosure. Further, frequently changing an information disclosure range is not desirable with respect to ensuring an efficient operation of the information disclosure system.

In the fifth embodiment, the degree of alienation of the user and another party user is determined based on not only a recently calculated calculation result but also data of calculation results determined further in the past, so that the alienation degree determining unit 38 can more precisely determine the degree of alienation of the user and the other party user. For example, when the calculation result of the interaction frequency calculating unit 37 is not based on statistics of past interaction frequencies accumulated in the calculation result accumulating unit 41, the alienation degree determining unit 38 does not take into account this calculation result by regarding this calculation result as an irregular result. That is, the alienation degree determining unit 38 does not immediately change the degree of alienation. Consequently, the alienation degree determining unit 38 can precisely determine the degree of alienation of the user and the other party user even when a situation that an irregular interaction frequency is changed occurs. Further, an information disclosure range does not frequently change in the information disclosure system, so that it is possible to make the operation of the information disclosure system more efficient.

In addition, a timing at which the interaction frequency calculating unit 37 executes processing of calculating an interaction frequency may be once a week or once a month instead of once a day.

The technique according to the present invention can be utilized for the information disclosure system, the information disclosure server and the information disclosing method which set a disclosure range of information disclosure. For example, it is possible to review settings of the disclosure range of information disclosure as time passes.

In addition, the present invention is not limited to the above embodiments, and can be optionally changed without departing from the spirit of the present invention. In other words, various changes which one of ordinary skill in the art can understand within the scope of the present invention can be added to the configurations and the details of the present invention. For example, the information disclosure system disclosed in the third to fifth embodiments may execute the processing according to the Examples 1 to 7 disclosed in the second embodiment.

A subject of each processing in the fourth and fifth embodiments may not be the information disclosure server 30 but a user terminal 20 as described in the third embodiment. Further, similar to the third embodiment, the alienation degree determining unit 38 according to the second embodiment may output to the disclosure range setting operating unit 39 information of only target users whose degrees of alienation have changed since a previous determination. Consequently, the processing disclosed in the description can be optionally combined and executed on the information disclosure system.

The terminals included in the information disclosure system in the second to fifth embodiments may be other types of communication terminals than a mobile terminal, such as a PC (Personal Computer).

A computer (e.g. a server, a PC or a mobile terminal) may be caused to execute the processing flow described in the first to fifth embodiments as one of controlling methods. For example, a computer may be caused to execute the processing flow as a control program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application is based upon and claims the benefit of priority from Japanese patent application No. 2012-225333, filed on Oct. 10, 2012, the disclosure of which is incorporated herein in its entirety by reference.

REFERENCE SIGNS LIST

1 INFORMATION DISCLOSURE SYSTEM
2 INFORMATION DISCLOSING UNIT
3 SETTING UNIT
4 HISTORY STORAGE UNIT
5 INTERACTION FREQUENCY CALCULATING UNIT
10 INFORMATION DISCLOSURE SYSTEM
20 USER TERMINAL
21 OTHER PARTY TERMINAL
30 INFORMATION DISCLOSURE SERVER
31 INFORMATION SHARE SETTING MANAGING UNIT
32 INTERACTION LOG UNIT
33 INFORMATION SHARING UNIT
34 TIMING GENERATING UNIT
35 INTERACTION HISTORY EXTRACTING UNIT
36 INTERACTION HISTORY ACCUMULATING UNIT
37 INTERACTION FREQUENCY CALCULATING UNIT
38 ALIENATION DEGREE DETERMINING UNIT
39 DISCLOSURE RANGE SETTING OPERATING UNIT
40 GROUP CLASSIFYING UNIT
41 CALCULATION RESULT ACCUMULATING UNIT

What is claimed is:

1. An information disclosure system that discloses user's information to a communicating party, the information disclosure system comprising:
an information disclosing unit that discloses at least part of the user's information as disclosure information to the communicating party;
a setting unit that sets a disclosure range for disclosing the user's information as the disclosure information in the information disclosing unit;
a history storage unit that stores a history of communication between the user and the communicating party; and
an interaction frequency calculating unit that calculates an interaction frequency between the user and the communicating party based on the history of the communication stored in the history storage unit,
wherein the setting unit sets the disclosure range based on the interaction frequency calculated by the interaction frequency calculating unit,
wherein, when the interaction frequency calculated by the interaction frequency calculating unit changes from a previously calculated interaction frequency, the setting unit changes a disclosure range to set,
wherein the setting unit sets a narrower disclosure range than a previous disclosure range when the interaction frequency calculated by the interaction frequency calculating unit is lower than the previously calculated interaction frequency, and sets a wider disclosure range than the previous disclosure range when the interaction frequency calculated by the interaction frequency calculating unit is higher than the previously calculated interaction frequency,
wherein, when a first interaction frequency calculated by the interaction frequency calculating unit based on the history of the communication stored in the history storage unit before a first time is lower than the previously calculated interaction frequency, the setting unit sets the disclosure range to a first disclosure range narrower than a previously set disclosure range, and when a second interaction frequency calculated by the interaction frequency calculating unit based on the history of the communication stored in the history storage unit before a second time after the first time is higher than the first interaction frequency, the setting unit sets the disclosure range to a second disclosure range wider than the first disclosure range, wherein in response to a request from a device of the communicating party received over a network for the user's information, the information disclosure system transmits back to the device of the communicating party over the network the user's information commensurate with the disclosure range that has been set.

2. The information disclosure system according to claim 1, wherein the setting unit sets a narrower disclosure range than the previous disclosure range by narrowing a disclosure range of information that makes it possible to specify the user among the user's information, and sets a wider disclosure range than the previous disclosure range by widening the disclosure range of the information that makes it possible to specify the user among the user's information.

3. The information disclosure system according to claim 1, wherein, when the history of the communication stored in the history storage unit includes communication performed from the user to the communicating party, the interaction frequency calculating unit calculates a higher interaction frequency of the user and the communicating party when the communication is newly performed from the user to the communicating party than when the communication is a response to communication previously performed from the communicating party to the user.

4. The information disclosure system according to claim 1, wherein, when the history of the communication stored in the history storage unit includes communication performed from the communicating party to the user, the interaction frequency calculating unit calculates a higher interaction frequency of the user and the communicating party when the communication is a response to communication previously performed from the user to the communicating party than when the communication is newly performed from the communicating party to the user.

5. The information disclosure system according to claim 3, wherein, by detecting a time interval of communication between the user and the communicating party in the history of the communication stored in the history storage unit, the interaction frequency calculating unit determines whether or not the communication performed between the user and the communicating party is a response to communication previously performed between the user and the communicating party.

6. The information disclosure system according to claim 1, wherein the history storage unit stores as the history of the communication a behavior history indicating that the user and the communicating party have been at positions close to each other.

7. The information disclosure system according to claim 6, further comprising a mobile terminal of the user and a mobile terminal of the communicating party, wherein, when the mobile terminal of the user and the mobile terminal of the communicating party approach each other and perform communication, the history storage unit-stores information related to the communication as the history of the communication.

8. The information disclosure system according to claim 1, further comprising:

data storage unit that stores image capturing data including the user and the communicating party as image capturing subjects; and extracting unit that extracts the history of the communication from the image capturing data stored in the data storage unit, and storing the history of the communication in the history storage unit.

9. The information disclosure system according to claim 1, further comprising group classifying unit that classifies a plurality of communicating parties into at least a first group and a second group, and setting the first group and the second group such that the setting unit sets a first disclosure range as the disclosure range to the first group and the setting unit sets a second disclosure range narrower than the first disclosure range as the disclosure range to the second group, wherein, when the interaction frequency calculated by the interaction frequency calculating unit with respect to a communicating party belonging to the first group or the second group changes, the group classifying unit changes the first group or the second group to which the communicating party belongs, based on the change of the interaction frequency.

10. The information disclosure system according to, claim 1, further comprising calculation result accumulating unit that accumulates a calculation result of the interaction frequency of the user and the communicating party previously calculated by the interaction frequency calculating unit, wherein the setting unit sets the disclosure range based on the interaction frequency calculated by the interaction frequency calculating unit and the calculation result accumulated in the calculation result accumulating unit.

11. The information disclosure system according to claim 10, wherein, when the setting unit determines that a value of the interaction frequency calculated by the interaction frequency calculating unit is more irregular than the calculation result accumulated in the calculation result accumulating unit, the setting unit keeps the disclosure range to set as is without changing the disclosure range.

12. An information disclosure server that discloses user's information to a communicating party, the information disclosure server comprising:

information disclosing unit that discloses at least part of the user's information as disclosure information to the communicating party;

setting unit that sets a disclosure range for disclosing the user's information as the disclosure information in the information disclosing unit;

history storage unit that stores a history of communication between the user and the communicating party; and interaction frequency calculating unit that calculates an interaction frequency between the user and the communicating party based on a the history of the communication stored in the history storage unit, wherein the setting unit sets the disclosure range based on the interaction frequency calculated by the interaction frequency calculating unit, wherein, when the interaction frequency calculated by the interaction frequency calculating unit changes from a previously calculated interaction frequency, the setting unit changes the disclosure range to set, wherein the setting unit sets a narrower disclosure range than a previous disclosure range when the interaction frequency calculated by the interaction frequency calculating unit is lower than the previously calculated interaction frequency, and sets a wider disclosure range than the previous disclosure range when the interaction frequency calculated by the interaction frequency calculating unit is higher than the previously calculated interaction frequency, wherein, when a first interaction frequency calculated by the interaction frequency calculating unit based on the history of the communication stored in the history storage unit before a first time is lower than the previously calculated interaction frequency, the setting unit sets the disclosure range to a first disclosure range narrower than a previously set disclosure range, and when a second interaction frequency calculated by the interaction frequency calculating unit based on the history of the communication stored in the history storage unit before a second time after the first time is higher than the first interaction frequency, the setting unit sets the disclosure range to a second disclosure range wider than the first disclosure range, wherein in response to a request from a device of the communicating party received over a network for the user's information, the information disclosure server transmits back to the device of the communicating party over the network the user's information commensurate with the disclosure range that has been set.

13. A communication terminal that sets disclosure range for disclosing user's information to a communicating party, the communication terminal comprising:

setting unit that sets a disclosure range for disclosing at least part of the user's information as disclosure information to the communicating party;

history storage unit that stores a history of communication between the user and the communicating party; and interaction frequency calculating unit that calculates an interaction frequency between the user and the communicating party based on the history of communication between the user and the communicating party, wherein the setting unit sets the disclosure range based on the interaction frequency calculated by the interaction frequency calculating unit, wherein, when the interaction frequency calculated by the interaction frequency calculating unit changes from a previously calculated interaction frequency, the setting unit changes the disclosure range to set, wherein the setting unit sets a narrower disclosure range than a previous disclosure range when the interaction frequency calculated by the interaction frequency calculating unit is lower than the previously calculated interaction frequency, and sets a wider disclosure range than the previous disclosure range when the interaction frequency calculated by the interaction frequency calculating unit is higher than the previously calculated interaction frequency, wherein, when a first interaction frequency calculated by the interaction frequency calculating unit based on the history of the communication stored in the history storage unit before a first time is lower than the previously calculated interaction frequency, the setting unit sets the disclosure range to a first disclosure range narrower than a previously set disclosure range, and when a second interaction frequency calculated by the interaction frequency calculating unit based on the history of the communication stored in the history storage unit before a second time after the first time is higher than the first interaction frequency, the setting unit sets the disclosure range to a second disclosure range wider than the first disclosure range, wherein in response to a request from a device of the communicating party received over a network for the user's information, the communication terminal transmits back to the device of the communicating party over the network the user's information commensurate with the disclosure range that has been set.

14. An information disclosing method of disclosing user's information to a communicating party, the information disclosing method comprising:

disclosing at least part of the user's information as disclosure information to the communicating party;

storing a history of communication between the user and the communicating party;

calculating an interaction frequency of the user and the communicating party based on a the stored history of the communication; and setting a disclosure range for disclosing the user's information as the disclosure information based on the calculated interaction frequency, wherein, when the interaction frequency calculated by the interaction frequency calculating unit changes from a previously calculated interaction frequency, the setting step changes a disclosure range to set, wherein the setting step sets a narrower disclosure range than a previous disclosure range when the interaction frequency calculated by the calculating step is lower than the previously calculated interaction frequency, and sets a wider disclosure range than the previous disclosure range when the interaction frequency calculated by the calculating step is higher than the previously calculated interaction frequency, wherein, when a first interaction frequency calculated by the calculating step based on the history of the communication stored in the storing step before a first time is lower than the previously calculated interaction frequency, the setting step sets the disclosure range to a first disclosure range narrower than a previously set disclosure range, and when a second interaction frequency calculated by the calculating step based on the history of the communication stored in the storing step before a second time after the first time is higher than the first interaction frequency, the setting step sets the disclosure range to a second disclosure range wider than the first disclosure range, wherein the method further comprises, in response to receiving a request from a device of the communicating party received over a network for the user's information, transmitting back to the device of the communicating party over the network the user's information commensurate with the disclosure range that has been set.

15. A non-transitory computer-readable medium having stored thereon a program that causes a computer to execute the information disclosing method according to claim 14.

16. An information disclosure system that discloses user's information to a communicating party, the information disclosure system comprising:

information disclosing means for disclosing at least part of the user's information as disclosure information to the communicating party;

setting means for setting a disclosure range for disclosing the user's information as the disclosure information in the information disclosing means;

history storage means for storing a history of communication between the user and the communicating party; and interaction frequency calculating means for calculating an interaction frequency between the user and the communicating party based on the history of the communication stored in the history storage means, wherein the setting means sets the disclosure range based on the interaction frequency calculated by the interaction frequency calculating means, wherein, when the interaction frequency calculated by the interaction frequency calculating means changes from a previously calculated interaction frequency, the setting means changes a disclosure range to set, wherein the setting means sets a narrower disclosure range than a previous disclosure range when the interaction frequency calculated by the interaction frequency calculating means is lower than the previously calculated interaction frequency, and sets a wider disclosure range than the previous disclosure range when the interaction frequency calculated by the interaction frequency calculating means is higher than the previously calculated interaction frequency, wherein, when a first interaction frequency calculated by the interaction frequency calculating means based on the history of the communication stored in the history storage means before a first time is lower than the previously calculated interaction frequency, the setting means sets the disclosure range to a first disclosure range narrower than a previously set disclosure range, and when a second interaction frequency calculated by the interaction frequency calculating means based on the history of the communication stored in the history storage unit before a second time after the first time is higher than the first interaction frequency, the setting means sets the disclosure range to a second disclosure range wider than the first disclosure range, wherein in response to a request from a device of the communicating party received over a network for the user's information, the information disclosure system transmits back to the device of the communicating party over the network the user's information commensurate with the disclosure range that has been set.

17. An information disclosure server that discloses user's information to a communicating party, the information disclosure server comprising:
  information disclosing means for disclosing at least part of the user's information as disclosure information to the communicating party;
  setting means for setting a disclosure range for disclosing the user's information as the disclosure information in the information disclosing means;
  history storage means for storing a history of communication between the user and the communicating party; and
  interaction frequency calculating means for calculating an interaction frequency between the user and the communicating party based on the history of the communication stored in the history storage means,
  wherein the setting means sets the disclosure range based on the interaction frequency calculated by the interaction frequency calculating means,
  wherein, when the interaction frequency calculated by the interaction frequency calculating means changes from a previously calculated interaction frequency, the setting means changes a disclosure range to set,
  wherein the setting means sets a narrower disclosure range than a previous disclosure range when the interaction frequency calculated by the interaction frequency calculating means is lower than the previously calculated interaction frequency, and sets a wider disclosure range than the previous disclosure range when the interaction frequency calculated by the interaction frequency calculating means is higher than the previously calculated interaction frequency,
  wherein, when a first interaction frequency calculated by the interaction frequency calculating means based on the history of the communication stored in the history storage means before a first time is lower than the previously calculated interaction frequency, the setting means sets the disclosure range to a first disclosure range narrower than a previously set disclosure range, and when a second interaction frequency calculated by the interaction frequency calculating means based on the history of the communication stored in the history storage unit before a second time after the first time is higher than the first interaction frequency, the setting means sets the disclosure range to a second disclosure range wider than the first disclosure range,
  wherein in response to a request from a device of the communicating party received over a network for the user's information, the information disclosure server transmits back to the device of the communicating party over the network the user's information commensurate with the disclosure range that has been set.

18. A communication terminal that sets disclosure range for disclosing user's information to a communicating party, the communication terminal comprising:
  setting means for setting a disclosure range for disclosing at least part of the user's information as disclosure information to the communicating party;
  history storage means for storing a history of communication between the user and the communicating party; and
  interaction frequency calculating means for calculating an interaction frequency between the user and the communicating party based on the history of communication between the user and the communicating party,
  wherein the setting means sets the disclosure range based on the interaction frequency calculated by the interaction frequency calculating means,
  wherein, when the interaction frequency calculated by the interaction frequency calculating means changes from a previously calculated interaction frequency, the setting means changes a disclosure range to set,
  wherein the setting means sets a narrower disclosure range than a previous disclosure range when the interaction frequency calculated by the interaction frequency calculating means is lower than the previously calculated interaction frequency, and sets a wider disclosure range than the previous disclosure range when the interaction frequency calculated by the interaction frequency calculating means is higher than the previously calculated interaction frequency,
  wherein, when a first interaction frequency calculated by the interaction frequency calculating means based on the history of the communication stored in the history storage means before a first time is lower than the previously calculated interaction frequency, the setting means sets the disclosure range to a first disclosure range narrower than a previously set disclosure range, and when a second interaction frequency calculated by the interaction frequency calculating means based on the history of the communication stored in the history storage unit before a second time after the first time is higher than the first interaction frequency, the setting means sets the disclosure range to a second disclosure range wider than the first disclosure range.

* * * * *